(12) United States Patent
Prahl

(10) Patent No.: US 10,982,803 B2
(45) Date of Patent: *Apr. 20, 2021

(54) FLUID DELIVERY DEVICE

(71) Applicant: ELKHART BRASS MANUFACTURING COMPANY, INC., Elkhart, IN (US)

(72) Inventor: Kevin Prahl, Elkhart, IN (US)

(73) Assignee: ELKHART BRASS MANUFACTURING COMPANY, LLC, Elkhart, IN (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/100,770

(22) Filed: Aug. 10, 2018

(65) Prior Publication Data

US 2018/0347735 A1    Dec. 6, 2018

Related U.S. Application Data

(63) Continuation of application No. 13/787,970, filed on Mar. 7, 2013, now Pat. No. 10,072,780.

(60) Provisional application No. 61/684,211, filed on Aug. 17, 2012.

(51) Int. Cl.
*F16L 27/08* (2006.01)
*A62C 31/24* (2006.01)
*A62C 31/02* (2006.01)

(52) U.S. Cl.
CPC ........... *F16L 27/08* (2013.01); *F16L 27/0808* (2013.01); *F16L 27/0828* (2013.01); *F16L 27/0845* (2013.01); *A62C 31/02* (2013.01); *A62C 31/24* (2013.01); *Y10T 137/6633* (2015.04)

(58) Field of Classification Search
CPC .............. F16L 27/0808; F16L 27/0828; F16L 27/0845; F16L 27/08; Y10T 137/6633; Y10T 137/8807; Y10T 137/88102; A62C 31/24; A62C 31/02; A62C 31/03; A62C 31/05; A62C 31/07; A62C 31/12; A62C 27/00; Y10S 285/92
See application file for complete search history.

(56) References Cited

U.S. PATENT DOCUMENTS

| | | | | | |
|---|---|---|---|---|---|
| 936,496 | A | * | 10/1909 | Vinnete | F16K 31/58 137/616.7 |
| 1,880,272 | A | * | 10/1932 | Panther, Jr. | A62C 31/24 169/54 |
| 2,698,664 | A | * | 1/1955 | Freeman | A62C 31/24 169/25 |
| 2,729,295 | A | * | 1/1956 | Edwards | A62C 31/24 169/25 |
| 2,986,344 | A | * | 5/1961 | Knight | A62C 31/24 239/587.2 |

(Continued)

*Primary Examiner* — Craig J Price
(74) *Attorney, Agent, or Firm* — Taft Stettinius & Hollister LLP; Derek B. Lavender

(57) ABSTRACT

Fluid delivery systems and methods for using fluid delivery systems are rotatable around two axes. In one embodiment, the fluid delivery system has a reduced swing radius and/or a reduced clearance area needed to rotate the fluid delivery device about one of the axes. The reduced swing radius and/or reduced clearance area allow for a more compact footprint of the fluid delivery system and a larger ratio of flow rate of fluid per unit of required clearance area.

25 Claims, 26 Drawing Sheets

(56) References Cited

U.S. PATENT DOCUMENTS

| | | | | |
|---|---|---|---|---|
| 2,998,199 A * | 8/1961 | Miscovich | F16L 27/0861 | 239/587.2 |
| 3,010,519 A * | 11/1961 | Gillespie | A62C 31/24 | 169/25 |
| 3,114,392 A * | 12/1963 | Harper | B61C 17/02 | 137/615 |
| 3,575,351 A * | 4/1971 | Warren | B05B 3/02 | 239/227 |
| 3,583,637 A * | 6/1971 | Miscovich | A62C 37/00 | 239/203 |
| 3,762,478 A * | 10/1973 | Cummins | A62C 27/00 | 169/24 |
| 3,770,062 A * | 11/1973 | Riggs | A62C 31/24 | 169/24 |
| 3,836,084 A * | 9/1974 | Luke | B05B 3/14 | 239/587.2 |
| 3,840,074 A * | 10/1974 | Clark | A62C 31/24 | 169/24 |
| 4,007,793 A * | 2/1977 | Hux | A62C 31/24 | 169/25 |
| 4,515,311 A * | 5/1985 | Takata | E03F 7/10 | 239/172 |
| 4,949,794 A * | 8/1990 | Petit | A62C 37/08 | 169/25 |
| 5,249,632 A * | 10/1993 | Sparling | B05B 15/654 | 169/52 |
| 5,301,756 A * | 4/1994 | Relyea | A62C 27/00 | 169/24 |
| 5,782,504 A * | 7/1998 | Chauncey | F16L 27/00 | 285/147.3 |
| 6,402,048 B1 * | 6/2002 | Collins | B05B 3/02 | 239/210 |
| D479,314 S * | 9/2003 | Trapp | D23/264 | |
| 6,655,613 B1 * | 12/2003 | Brown | B05B 15/652 | 239/587.1 |
| 6,811,188 B2 * | 11/2004 | Haviland | F16L 27/08 | 285/272 |
| 6,994,282 B2 * | 2/2006 | Trapp | A62C 31/24 | 169/24 |
| 7,137,578 B2 * | 11/2006 | Steingass | A62C 31/24 | 239/587.2 |
| 7,147,062 B2 * | 12/2006 | Kolacz | H02G 11/003 | 169/43 |
| 7,191,964 B2 * | 3/2007 | Trapp | A62C 31/24 | 169/24 |
| 7,243,864 B2 * | 7/2007 | Trapp | A62C 31/24 | 169/24 |
| 7,802,630 B2 * | 9/2010 | Combs | B05B 15/652 | 169/52 |
| 8,245,790 B2 * | 8/2012 | Lozier | A62C 31/28 | 169/43 |
| 8,606,373 B2 * | 12/2013 | Lozier | A62C 37/00 | 169/54 |
| 8,678,022 B2 * | 3/2014 | Uhler | F16L 27/0816 | 137/15.18 |
| 8,714,466 B2 * | 5/2014 | Trapp | A62C 31/24 | 239/587.2 |
| 8,827,189 B2 * | 9/2014 | Vanagosoom | A62C 99/00 | 169/24 |
| 9,557,199 B2 * | 1/2017 | Combs | A62C 37/50 | |
| 9,675,826 B2 * | 6/2017 | Uhler | A62C 31/00 | |
| 10,072,780 B2 * | 9/2018 | Prahl | F16L 27/0828 | |
| 2004/0051312 A1 * | 3/2004 | Haviland | A62C 31/24 | 285/276 |
| 2004/0089735 A1 * | 5/2004 | Drechsel | B05B 3/063 | 239/195 |
| 2004/0216902 A1 * | 11/2004 | Trapp | A62C 31/24 | 169/52 |
| 2005/0167122 A1 * | 8/2005 | Trapp | A62C 31/24 | 169/52 |
| 2006/0091241 A1 * | 5/2006 | Trapp | A62C 31/24 | 239/587.2 |
| 2008/0060706 A1 * | 3/2008 | Combs | A62C 35/68 | 137/556 |
| 2008/0061172 A1 * | 3/2008 | Trapp | A62C 37/00 | 239/587.5 |
| 2009/0008105 A1 * | 1/2009 | Price | A62C 27/00 | 169/52 |
| 2009/0101368 A1 * | 4/2009 | Lozier | B05B 15/652 | 169/56 |
| 2009/0321091 A1 * | 12/2009 | Trapp | A62C 37/00 | 169/51 |
| 2010/0274397 A1 * | 10/2010 | Lozier | G05B 19/042 | 700/283 |
| 2011/0017477 A1 * | 1/2011 | Combs | F16K 5/0647 | 169/16 |
| 2011/0174383 A1 * | 7/2011 | Combs | A62C 31/24 | 137/12 |
| 2011/0253397 A1 * | 10/2011 | Combs | A62C 31/28 | 169/51 |
| 2012/0305273 A1 * | 12/2012 | Lozier | A62C 3/00 | 169/56 |
| 2013/0119167 A1 * | 5/2013 | Trapp | A62C 31/24 | 239/587.5 |
| 2017/0095682 A1 * | 4/2017 | Combs | A62C 37/50 | |

* cited by examiner

FLUID DELIVERY DEVICE

RELATED APPLICATIONS

This application is a Continuation of application Ser. No. 13/787,970, titled "FLUID DELIVERY DEVICE," filed on Mar. 7, 2013, which claims the benefit of U.S. Provisional Application No. 61/684,211, filed Aug. 17, 2012, the entire disclosures of which are hereby expressly incorporated herein by reference in their entirety.

FIELD

The present disclosure generally relates to a fluid delivery system and, more particularly, to a fluid delivery device rotatable about two axes, such as a monitor or the like.

SUMMARY

The present disclosure provides fluid delivery systems and methods for using fluid delivery systems which are rotatable around two axes. In one embodiment, the fluid delivery system has a reduced swing radius and/or a reduced clearance area needed to rotate the fluid delivery device about one of the axes. The reduced swing radius and/or reduced clearance area allow for a more compact footprint of the fluid delivery system and a larger ratio of flow rate of fluid per unit of required clearance area.

More particularly, according to an exemplary embodiment, a fluid delivery device is provided. The fluid delivery device includes a base section; an intermediate section rotatably connected to the base section and configured to rotate about a first axis relative to the base section, the intermediate section including an elbow portion; an outlet section rotatably connected to the intermediate section and configured to rotate about a second axis relative to the intermediate section; and an actuator configured to rotate the outlet section relative to the intermediate section about the second axis, wherein the elbow portion of the intermediate section and the actuator are located on opposite sides of a plane including the first axis. In a more particular embodiment, the intermediate section may be rotatably connected to the outlet section by a first rotatable bearing and a second rotatable bearing, wherein the fluid passageway passes through the first rotatable bearing, but is located outside of the second rotatable bearing. In a more particular embodiment of any of the above embodiments, the intermediate section may include a cradle configured to support the outlet section and allow the outlet section to rotate between a first position and a second position, wherein the cradle does not encircle the fluid passageway. In another more particular embodiment of any of the above embodiments, the fluid delivery device may further comprise a thrust rod between the intermediate section and the outlet section, the thrust rod being positioned at least partially outside the fluid passageway and configured to be in compression when pressurized fluid is provided in the fluid passageway.

According to another exemplary embodiment, a fluid delivery device is provided. The fluid delivery device includes a base section configured to be in fluid communication with a pressurized fluid source; an intermediate section rotatably connected to the base section and configured to rotate about a first axis relative to the base section; an outlet section rotatably connected to the intermediate section by a first rotatable bearing and a second rotatable bearing, the outlet section being configured to rotate about a second axis relative to the intermediate section; and a fluid passageway passing through the base section, the intermediate section, and the outlet section providing pressurized fluid to a discharge port in the outlet section, the fluid passageway passing through the first rotatable bearing but located outside the second rotatable bearing. In a more particular embodiment, the fluid delivery device may include an actuator configured to rotate the outlet section relative to the intermediate section, wherein the intermediate section includes an elbow portion, the elbow portion and the actuator being positioned on opposite sides of a plane including the first axis. In a more particular embodiment of any of the above embodiments, the intermediate section may include a cradle configured to support the outlet section and allow the outlet section to rotate between a first position and a second position, wherein the cradle does not encircle the fluid passageway. In another more particular embodiment of any of the above embodiments, the fluid delivery device may further comprise a thrust rod between the intermediate section and the outlet section, the thrust rod being positioned at least partially outside the fluid passageway and configured to be in compression when pressurized fluid is provided in the fluid passageway.

According to still another exemplary embodiment, a fluid delivery device is provided. The fluid delivery device includes a base section configured to be in fluid communication with a pressurized fluid source; an intermediate section rotatably connected to the base section and configured to rotate about a first axis relative to the base section, the intermediate section including a cradle; and an outlet section rotatably connected to the cradle and configured to rotate about a second axis relative to the intermediate section; a fluid passageway passing through the base section, intermediate section, and outlet section configured to provide pressurized fluid to a discharge port affixed to the outlet section; wherein the cradle does not encircle the fluid passageway, the cradle being configured to support the outlet section and allow the outlet section to rotate between a first position and a second position. In a more particular embodiment, the fluid delivery device may include an actuator configured to rotate the outlet section relative to the intermediate section, wherein the intermediate section includes an elbow portion, the elbow portion and the actuator being positioned on opposite sides of a plane including the first axis. In a more particular embodiment, the intermediate section may be rotatably connected to the outlet section by a first rotatable bearing and a second rotatable bearing, wherein the fluid passageway passes through the first rotatable bearing, but is located outside of the second rotatable bearing. In another more particular embodiment of any of the above embodiments, the fluid delivery device may further comprise a thrust rod between the intermediate section and the outlet section, the thrust rod being positioned at least partially outside the fluid passageway and configured to be in compression when pressurized fluid is provided in the fluid passageway.

According to yet another exemplary embodiment, a fluid delivery device is provided. The fluid delivery device includes a base section configured to be in fluid communication with a pressurized fluid source; an intermediate section rotatably connected to the base section and configured to rotate about a first axis relative to the base section; an outlet section rotatably connected to the intermediate section and configured to rotate about a second axis relative to the intermediate section; a fluid passageway passing through the base section, the intermediate section, and the outlet section providing pressurized fluid to a discharge port in the outlet section; and a thrust rod between the intermediate section and the outlet section, the thrust rod being positioned at least partially outside the fluid passageway and configured to be in compression when pressurized fluid is provided in the fluid passageway. In a more particular embodiment, the fluid delivery device may include an actuator configured to rotate the outlet section relative to the intermediate section, wherein the intermediate section includes an elbow portion, the elbow portion and the actuator being positioned on opposite sides of a plane including the first axis. In a more particular embodiment, the intermediate section may be rotatably connected to the outlet section by a first rotatable bearing and a second rotatable bearing, wherein the fluid passageway passes through the first rotatable bearing, but is located outside of the second rotatable bearing. In a more particular embodiment of any of the above embodiments, the intermediate section may include a cradle configured to support the outlet section and allow the outlet section to rotate between a first position and a second position, wherein the cradle does not encircle the fluid passageway.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

The embodiments disclosed herein are not intended to be exhaustive or to limit the invention to the precise forms disclosed in the following detailed description. Rather, the embodiments are chosen and described so that others skilled in the art may utilize their teachings. While the present disclosure primarily involves a monitor, it should be understood that the invention may also have application to other fluid delivery devices. Monitors include fluid delivery devices with an outlet adjustable about multiple axes and may be referred to by other names, including nozzles, turrets, discharge devices, deck guns, and water cannons. Monitors are aimable, controllable high-capacity devices used for directing a stream of water or other fluid in a desired direction. For example, some vehicle-mounted firefighting monitors are sized to deliver a fluid flow volume between about 60-200 US gallons/minute, while "master stream" firefighting monitors are typically mounted to a fixed installation or vehicle and may deliver a fluid flow volume between 350-2,500 US gallons/minute or greater. Also, firefighting monitors may be rated to withstand fluid pressures as great as about 250 psi or about 500 psi.

Figure 1:
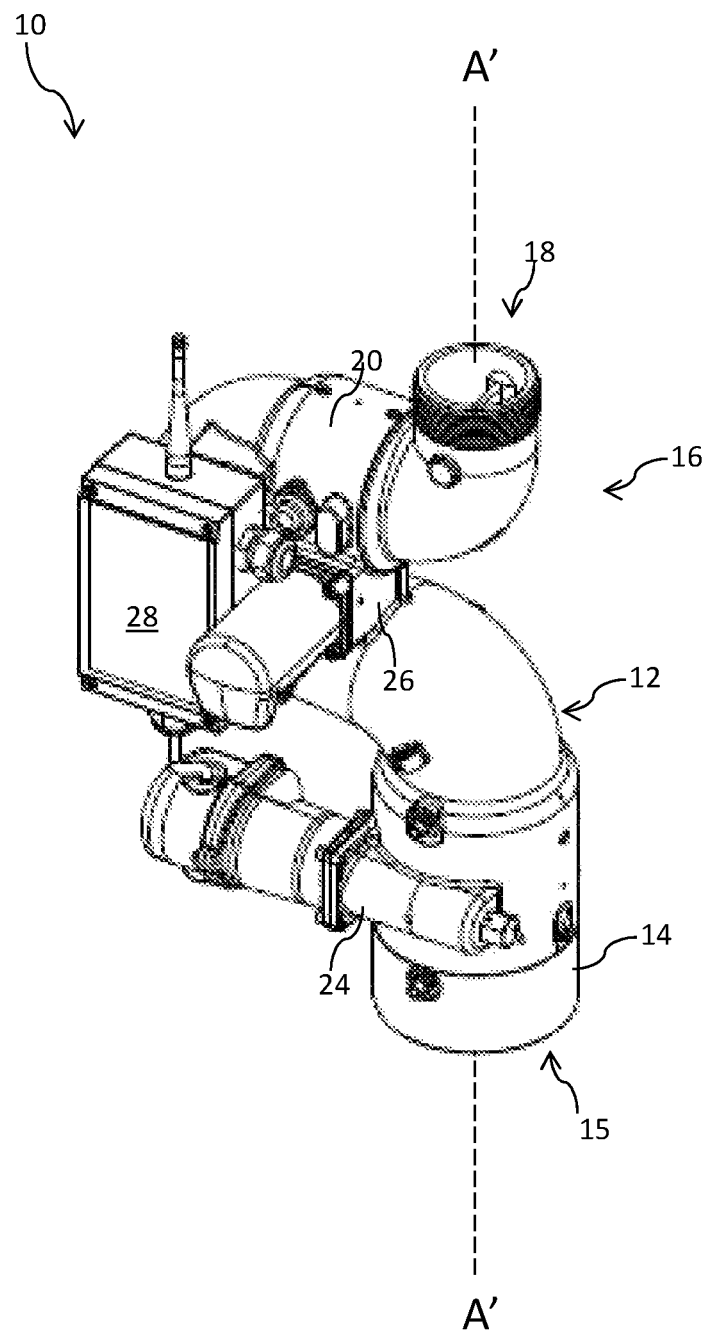
FIG. 1 is a perspective view of an exemplary fluid delivery device.
Figure 2:
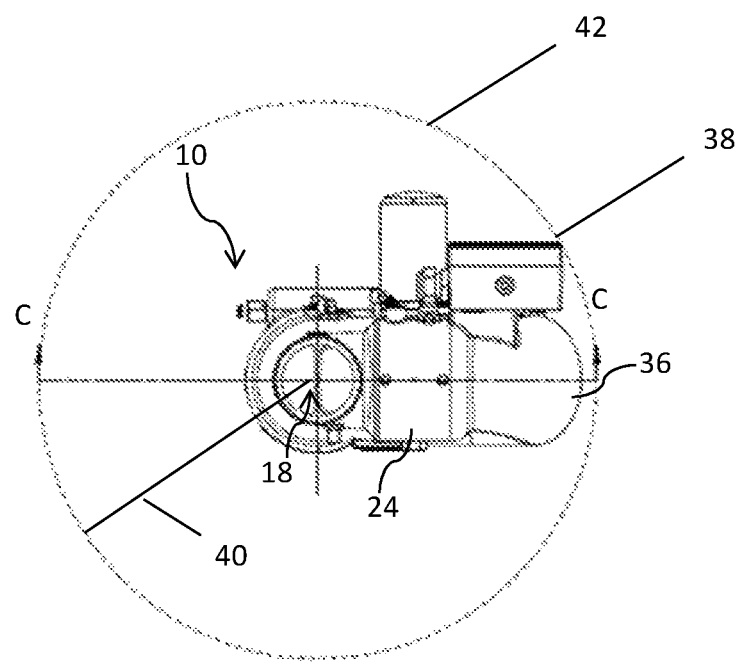
FIG. 2 is a top plan view of the fluid delivery device of FIG. 1.
Figure 3:
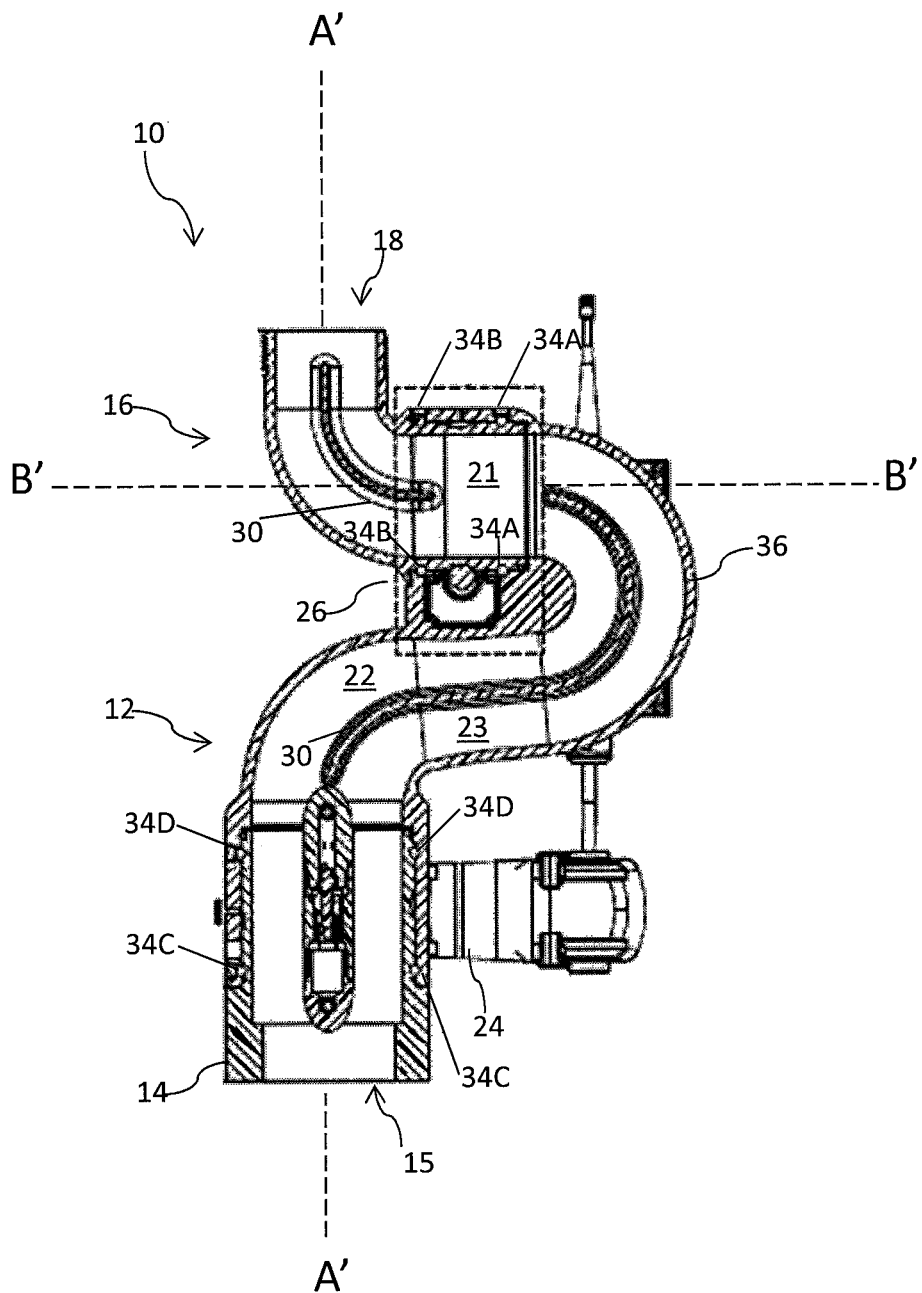
FIG. 3 is a front elevation sectional view of the fluid delivery device of FIG. 2 along the line C-C.

Referring to FIGS. 1-3, a fluid delivery device 10 is illustrated. Illustrated fluid delivery device 10 is a monitor, but fluid delivery device 10 may comprise other suitable fluid delivery devices rotating about an axis. Other exemplary fluid delivery devices include other fire fighting fluid delivery devices, de-icing devices (e.g. devices used to remove ice from airplane wings), and agricultural fluid delivery devices.

In the illustrated embodiment, fluid delivery device 10 comprises a plurality of pipe sections including base section 14, intermediate section 12, and outlet section 16. The plurality of pipe sections form a fluid passageway 22 (FIG. 3) fluidly connecting an inlet 15 to an outlet or discharge port 18. Exemplary fluids include, but are not limited to water, de-icing fluid, and foam fire retardant. Exemplary fluid sources include fire fighting vehicles having a fluid reservoir, a water main, a foam reservoir, a de-icing tank, a tractor or other vehicle having a water tank, and other suitable sources for obtaining fluids. Inlet 15 is configured to attach to a pressurized fluid source. In one embodiment, discharge port 18 includes or is configured to be attached to a nozzle (not shown).

Base section 14 may be mounted to a fixed or portable base, or may be mounted on a vehicle, such as a fire fighting vehicle, an agricultural vehicle, or a de-icing vehicle. In the illustrated embodiment, intermediate section 12 is rotatably attached to base section 14 and rotates about generally vertical axis A'-A'. Rotation about axis A'-A' provides horizontal adjustment for discharge port 18 (when outlet section 16 is not positioned to orient discharge port 18 vertically as illustrated in FIGS. 1-3) and allows fluid flowing through fluid delivery device 10 to be aimed in a desired horizontal direction. First actuator 24 controls the rotational movement of the intermediate section 12 about base section 14. Exemplary actuators are disclosed in U.S. Pat. No. 7,191,964, issued Mar. 20, 2007 and U.S. Patent Application Publication No. 2009/0101368, published Apr. 23, 2009, the disclosures of which are hereby expressly incorporated by reference in their entireties. In one exemplary embodiment, first actuator 24 includes a worm gear intermeshing with gear teeth fixed to intermediate section 12. First actuator 24 further includes a motor driving the worm gear, engaging the gear teeth and causing intermediate section 12 to rotate relative to base section 14. Other suitable rotation devices may also be used. As illustrated in FIG. 3, intermediate section 12 rotates about base section 14 on bearings 34C and 34D.

Referring again to FIGS. 1 and 3, in the illustrated embodiment intermediate section 12 is rotatably attached to outlet section 16 and rotates about a generally horizontal axis B'-B' (FIG. 3). As illustrated, intermediate section 12 includes collar portion 20, into which outlet section 16 is placed to rotatably couple intermediate section 12 and outlet section 16. Rotation about axis B'-B' provides vertical adjustment for discharge port 18 and further allows fluid flowing through fluid delivery device 10 to be aimed in a desired vertical direction. Second actuator 26 controls the rotational movement of the outlet section 16 about the intermediate section 12 by engaging outlet section 16 in the collar portion 20. Second actuator 26 may control the rotational movement of the outlet section 16 about intermediate section 12 in the same way first actuator 24 controls the rotational movement of the intermediate section 12 about the base section 14.

As illustrated in FIG. 3, outlet section 16 rotates about intermediate section 12 on first bearing 34A and second bearing 34B. Bearings 34A and 34B are positioned in a groove, race, or track in the pipe section for receiving the bearings. As illustrated in FIG. 3, the groove, race, or track for bearings 34A and 34B encircle fluid passageway 22. First bearing 34A and second bearing 34B are illustrated positioned in generally the same position about axis B'-B'. This position is facilitated by a portion 21 of fluid passageway 22 through collar portion 20 between first bearing 34A and second bearing 34B that is configured generally linearly. This configuration further lengthens fluid passageway 22 both in the portion 21 between first bearing 34A and second bearing 34B and in a corresponding portion 23 of fluid passageway 22 on the opposite side of U-shaped elbow 36.

As illustrated in FIG. 3, intermediate section 12 rotates about base section 14 on bearings 34C and 34D. Bearings 34C and 34D are positioned in a groove, race, or track in the pipe section for receiving the bearings. As illustrated in FIG. 3, the groove, race, or track for bearings 34C and 34D encircle fluid passageway 22 and are illustrated positioned in generally the same position about axis A'-A'. This position is facilitated by a portion of fluid passageway 22 between bearings 34C and 34D that is configured generally linearly.

Actuators 24, 26, may be controlled by control system 28. In the illustrated embodiment, control system 28 receives control signals from an external input device. In the illustrated embodiment, control system 28 wirelessly receives control signals. An exemplary control system is disclosed in U.S. Pat. No. 8,245,790, issued Aug. 21, 2012, the disclosure of which is hereby expressly incorporated by reference in its entirety. Other suitable control systems, including remote control, control systems having position sensors and feedback loops, and manual control, such as disclosed in U.S. Provisional Patent Application Ser. No. 61/759,226, filed Jan. 31, 2013, the disclosure of which is hereby expressly incorporated by reference in its entirety, may also be used.

As illustrated in FIG. 3, fluid passageway 22 may include one or more vanes 30 in one embodiment, vanes 30 assist guiding fluid through fluid passageway 22.

As illustrated in FIG. 3, intermediate section 12 includes U-shaped elbow 36. In the illustrated embodiment, collar portion 20, second actuator 26, first bearing 34A, second bearing 34B, and U-shaped elbow 36 are positioned on the same side of generally vertical axis A'-A' as viewed in FIG. 3.

As illustrated in FIG. 2, fluid delivery device 10 includes clearance defining point 38. Clearance defining point 38 is the surface of fluid delivery device 10 rotating about axis A'-A' that is furthest away from axis A'-A'. In the illustrated embodiment, clearance defining point 38 is an outermost corner of the control system 28, as shown in FIG. 2. Depending on the particular structural arrangement, however, other components of fluid delivery device 10 may define the clearance defining point 38. For example, in another embodiment, the clearance defining point is positioned on intermediate section 12 or second actuator 26. In still another embodiment, the clearance defining point is positioned on U-shaped elbow 36. The distance between clearance defining point 38 and axis A'-A' around which fluid delivery device 10 rotates defines swing radius 40. In one exemplary embodiment, swing radius 40 is about 24.6 cm (9.7 inches) for a fluid delivery device 10 having a fluid passageway 22 having a maximum diameter of about 9.5 cm (3¾ inches). Rotating fluid delivery device 10 about axis A'-A' defines the required clearance area 42. The required clearance area 42 is the space needed around conventional fluid delivery device 10 to fully rotate device 10 about axis A'-A'. In some embodiments, swing radius 40 and/or clearance area 42 may be increased when outlet section 16 is not aligned parallel to axis A'-A', such as when outlet section 16 is positioned in a non-vertical orientation. The swing radius 40 and/or clearance area 42 can be decreased by rotating outlet section 16 about axis B'-B' until outlet section 16 is aligned parallel to axis A'-A', such as in the vertical position illustrated in FIGS. 1-3.

Referring next to FIGS. 4-9, an exemplary fluid delivery device 50 is illustrated. As explained below, fluid delivery device 50 has a reduced clearance area compared to fluid delivery device 10, allowing for a more compact footprint and rotation area, as well as a larger ratio of flow rate of fluid per unit of required clearance area. Illustrated fluid delivery device 50 is a monitor, but fluid delivery device 50 may comprise other suitable fluid delivery devices rotating about an axis. Other exemplary fluid delivery devices include other fire fighting fluid delivery devices, de-icing devices (e.g. devices used to remove ice from airplane wings), and agricultural fluid delivery devices.

In the illustrated embodiment, fluid delivery device 50 includes a plurality of pipe sections including base section 54, intermediate section 52, and outlet section 56. The plurality of pipe sections form a fluid passageway 62 (FIG. 6) fluidly connecting an inlet 55 to an outlet or discharge port 58. Exemplary fluids include, but are not limited to water, de-icing fluid, and foam fire retardant. Exemplary fluid sources include fire fighting vehicles having a fluid reservoir, a water main, a foam reservoir, a de-icing tank, a tractor or other vehicle having a water tank, and other suitable sources for obtaining fluids. Inlet 55 is configured to attach to a pressurized fluid source. In one embodiment, discharge port 58 includes or is configured to be attached to a nozzle (not shown). In one embodiment, fluid delivery device 50 includes one or more vanes (not shown) helping guide the fluid through fluid passageway 62, similar to vanes 30 of fluid delivery device 10 shown in FIG. 3.

Figure 4:
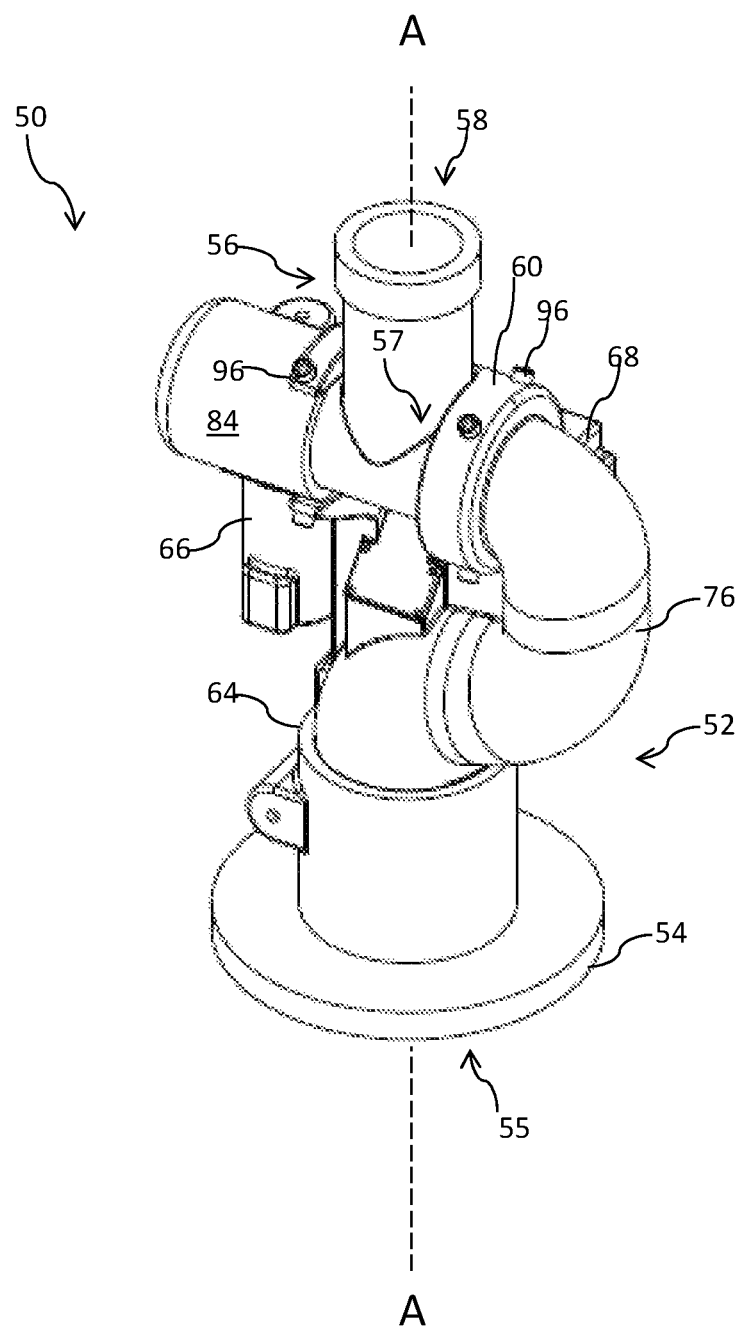
FIG. 4 is a perspective view of another exemplary fluid delivery device.
Figure 5:
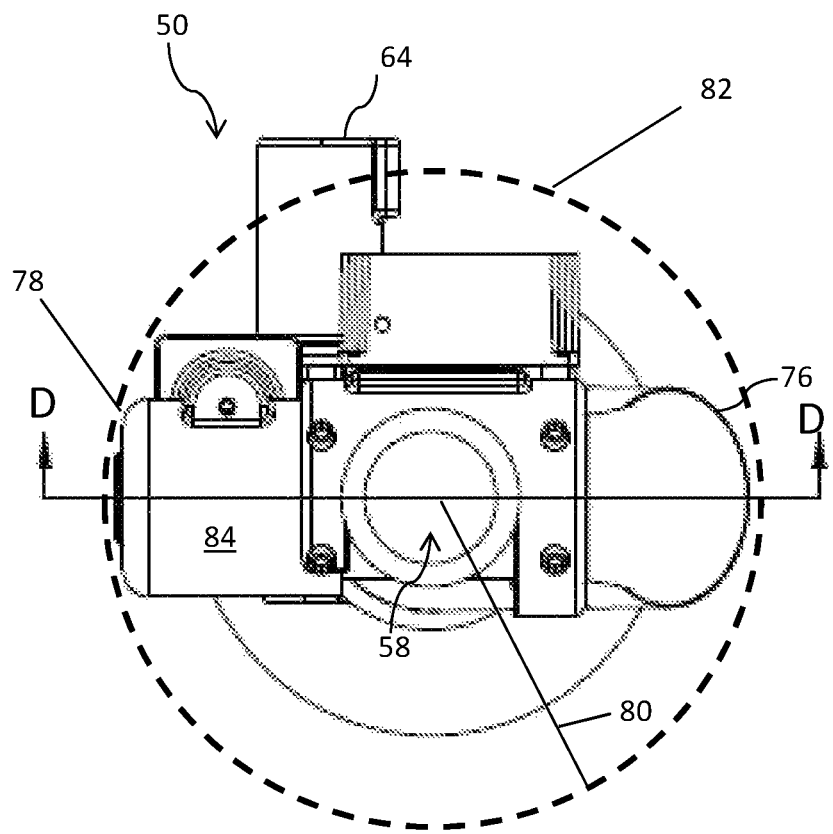
FIG. 5 is a top plan view of the fluid delivery device of FIG. 4.
Figure 6:
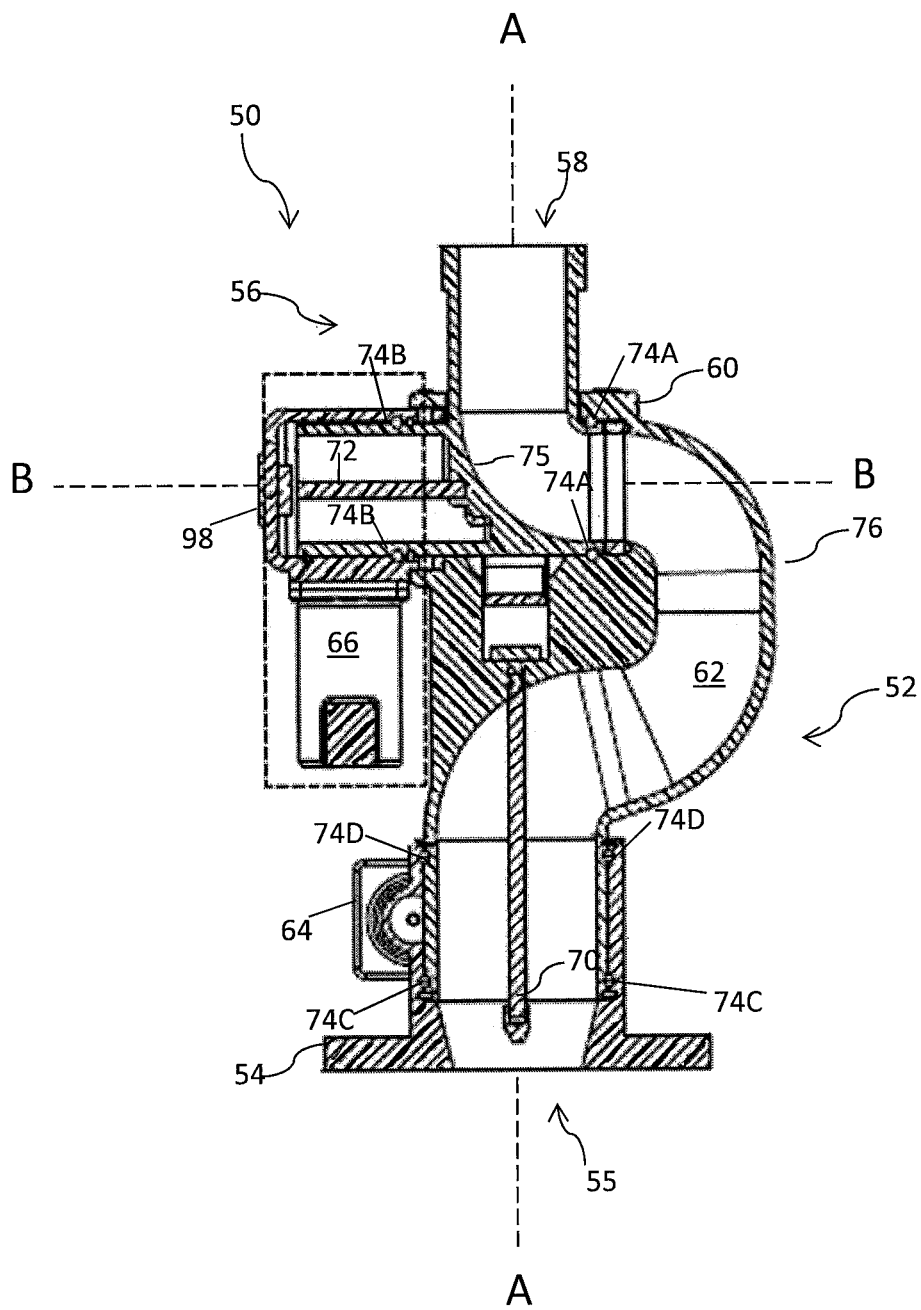
FIG. 6 is a front elevation sectional view of the fluid delivery device of FIG. 5 along the line D-D.

Base section 54 may be mounted to a fixed or portable base, or may be mounted on a vehicle, such as a fire fighting vehicle, an agricultural vehicle, or a de-icing vehicle. In the illustrated embodiment, intermediate section 52 is rotatably attached to base section 54 and rotates about generally vertical axis A-A. Rotation about axis A-A provides horizontal adjustment for discharge port 58 (when outlet section 56 is not positioned to orient discharge port 58 vertically as illustrated in FIGS. 4-6) and allows fluid flowing through fluid delivery device 50 to be aimed in a desired horizontal direction. First actuator 64 controls the rotational movement of the intermediate section 52 about base section 54. Exemplary actuators are disclosed in U.S. Pat. No. 7,191,964, issued Mar. 20, 2007 and U.S. Patent Publication No. 2009/0101368, published Apr. 23, 2009, the disclosures of which are hereby expressly incorporated by reference in their entireties. In one exemplary embodiment, first actuator 64 includes a worm gear intermeshing with gear teeth fixed to intermediate section 52. First actuator 64 further includes a motor driving the worm gear, engaging the gear teeth and causing intermediate section 52 to rotate relative to base section 54. Other suitable rotation devices may also be used. As illustrated in FIG. 6, intermediate section 52 rotates about base section 54 on bearings 74C and 74D.

Figure 7:
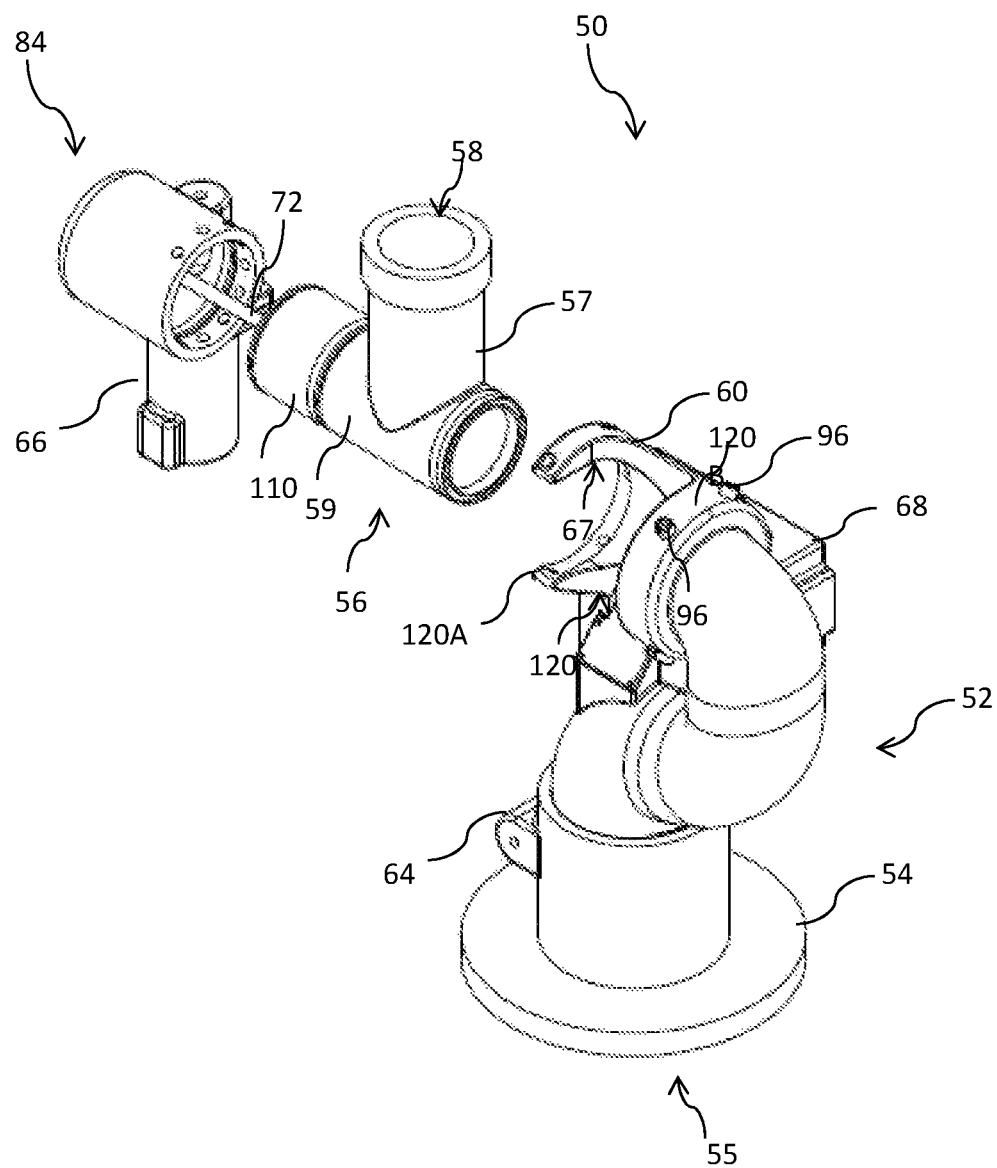
FIG. 7 is an exploded perspective view of the fluid delivery device of FIG. 4.

Referring again to FIG. 6, in the illustrated embodiment intermediate section 52 is rotatably attached to outlet section 56 and rotates about a generally horizontal axis B-B. Although illustrated as generally vertical and generally horizontal, in another embodiment axis A-A may not be generally horizontal and axis B-B may not be generally vertical. A generally horizontal axis is nominally horizontal or within a few degrees of horizontal. A generally vertical axis is nominally vertical or within a few degrees of vertical. In the illustrated embodiment, axis A-A is transverse to axis B-B. In one embodiment, axis A-A is perpendicular to axis B-B. In one embodiment, axis A-A is orthogonal to axis B-B. Generally orthogonal is nominally orthogonal or within a few degrees of orthogonal. As illustrated, intermediate section 52 includes cradle portion 60 within which outlet section 56 is rotatably coupled. Cradle portion 60 includes groove 67 (FIG. 7) which allows outlet section 56 to rotate about axis B-B as described below. Rotation about axis B-B provides vertical adjustment for discharge port 58 and further allows fluid flowing through fluid delivery device 50 to be aimed in a desired direction. As best seen in FIG. 7, second actuator 66 controls the rotational movement of the outlet section 56 about the intermediate section 52 by engaging an inner sleeve 110 of outlet section 56 in cap 84. Second actuator 66 may control the rotational movement of the outlet section 56 as described in more detail below.

As illustrated in FIG. 6, outlet section 56 rotates about intermediate section 52 on first bearing 74A and second bearing 74B. Bearings 74A and 74B are positioned in a groove, race, or track in the pipe section for receiving the bearings. As illustrated in FIG. 6, the groove, race, or track for bearing 74A encircles fluid passageway 62, but the groove, race, or track for bearing 74B encircles inner sleeve 110 of outlet section 56 located outside of the fluid passageway 62 such that bearing 74B does not encircle fluid passageway 62. In the illustrated embodiment, bearing 74A and bearing 74B are substantially the same size, and both bearings are centered around axis B-B. By positioning second bearing 74B outside fluid passageway 62, the length of fluid passageway 62 can be decreased compared to a position such as illustrated in FIG. 3 where both bearings 34A and 34B encircle the fluid passageway. This decreased length may contribute to decreased friction losses for fluid passing through the fluid passageway 62.

Referring again to FIG. 6, actuators 64, 66, may be controlled by control system 68. An exemplary control system is disclosed in U.S. Pat. No. 8,245,790, issued Aug. 21, 2012, the disclosure of which is hereby expressly incorporated by reference in its entirety. Other suitable control systems, including remote control systems having position sensors and feedback loops, and manual control, such as disclosed in U.S. Provisional Patent Application Ser. No. 61/759,226, filed Jan. 31, 2013, the disclosure of which is hereby expressly incorporated by reference in its entirety, may also be used. In one embodiment, control system 68 is remotely positioned and communicates wirelessly with first actuator 64 and second actuator 66.

As illustrated in FIG. 5, fluid delivery device 50 includes clearance defining point 78. Clearance defining point 78 is the surface of fluid delivery device 50 rotating about axis A-A that is furthest away from axis A-A. In the illustrated embodiment, clearance defining point 78 is a portion of cap 84. Depending on the particular structural arrangement, however, other components of fluid delivery device 50 may define clearance defining point 78. For example, in another embodiment, the clearance defining point is a portion of intermediate section 52 or a portion of the second actuator 66. In still another embodiment, the clearance defining point is a portion of U-shaped elbow 76. In yet still another embodiment, the clearance defining point is a portion of control system 68. In the illustrated embodiment of FIG. 5, the clearance defining point 78 is not positioned on first actuator 64.

As illustrated, intermediate section 52 is inserted into base section 54. The first actuator 64 engages gear teeth positioned on intermediate section 52. The first actuator 64 is stationary while intermediate section 52 and outlet section 56 rotate about axis A-A. The distance between clearance defining point 78 and axis A-A around which fluid delivery device 50 rotates defines swing radius 80. In one exemplary embodiment, swing radius 80 is about 15 cm (6.0 inches) for a fluid delivery device 50 having a fluid passageway 62 having a maximum diameter of about 9.5 cm (3¾ inches). Rotating fluid delivery device 50 about axis A-A defines the required clearance area 82. The required clearance area 82 is the space needed around fluid delivery device 50 to fully rotate about axis A-A. In some embodiments, swing radius 80 and/or clearance area 82 may be increased when outlet section 56 is not aligned parallel to axis A-A, such as when outlet section 56 is positioned in a non-vertical orientation. The swing radius 80 and/or clearance area 82 can be decreased by rotating outlet section 56 about axis B-B until outlet section 56 is aligned parallel to axis A-A, such as in the vertical position illustrated in FIGS. 4-6.

As illustrated in FIG. 5, positioning the second actuator 66 and U-shaped elbow 76 on opposite sides of a plane through axis A-A allows for a decreased swing radius 80 and decreased required clearance area 82 compared to the clearance area 42 of fluid delivery device 10. This allows for a more compact footprint and rotation area of the fluid delivery device 50 and allows a larger ratio of flow rate of fluid per unit of required clearance area compared to fluid delivery device 10.

Figure 8:
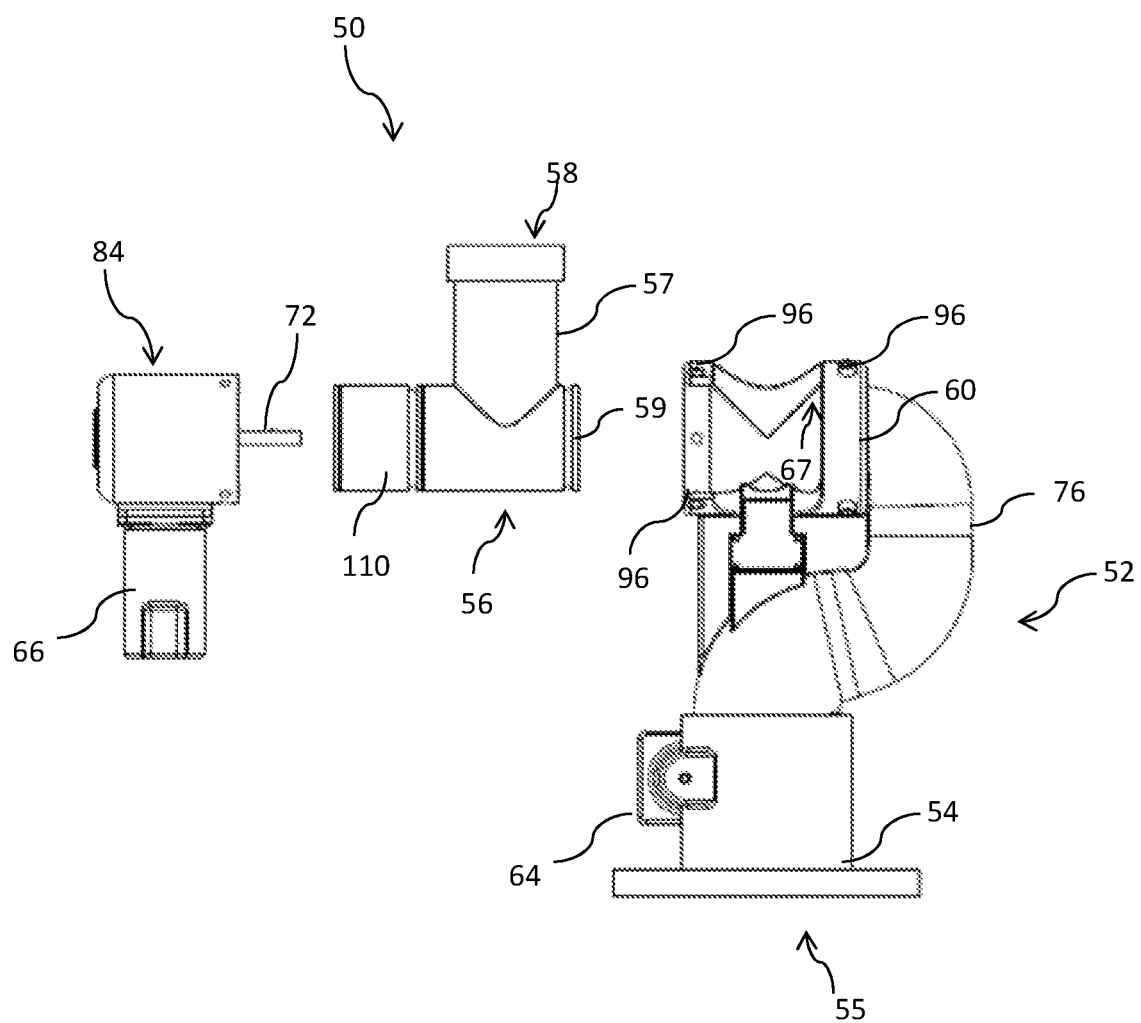
FIG. 8 is an exploded front elevation view of the fluid delivery device of FIG. 4.
Figure 9A:
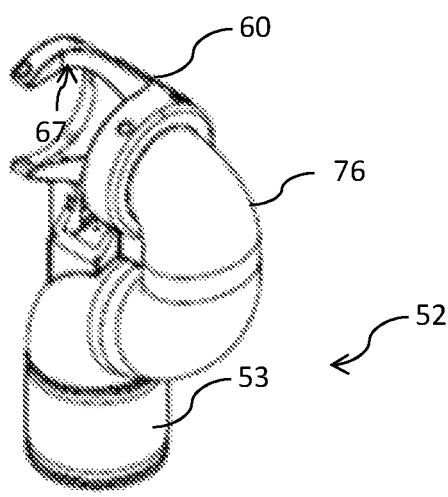
FIG. 9A is a perspective view of the intermediate section of the fluid delivery device of FIG. 4.
Figure 9B:
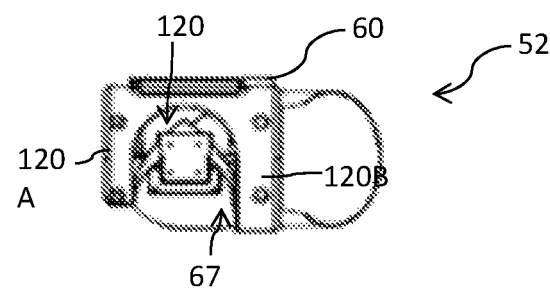
FIG. 9B is a top plan view of the intermediate section of the fluid delivery device of FIG. 4.
Figure 9C:
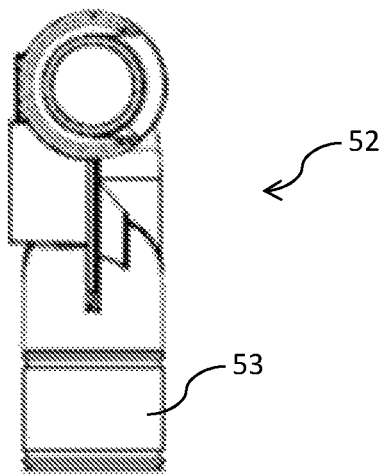
FIG. 9C is a side elevation view of the intermediate section of the fluid delivery device of FIG. 4.
Figure 9D:
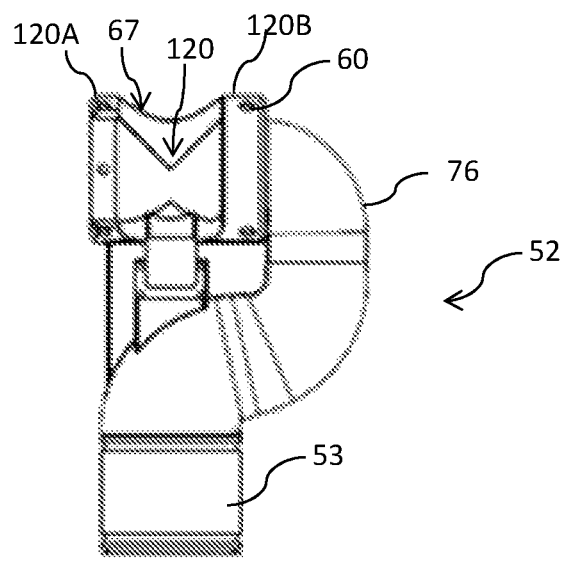
FIG. 9D is a front elevation view of the intermediate section of the fluid delivery device of FIG. 4.
Figure 10:
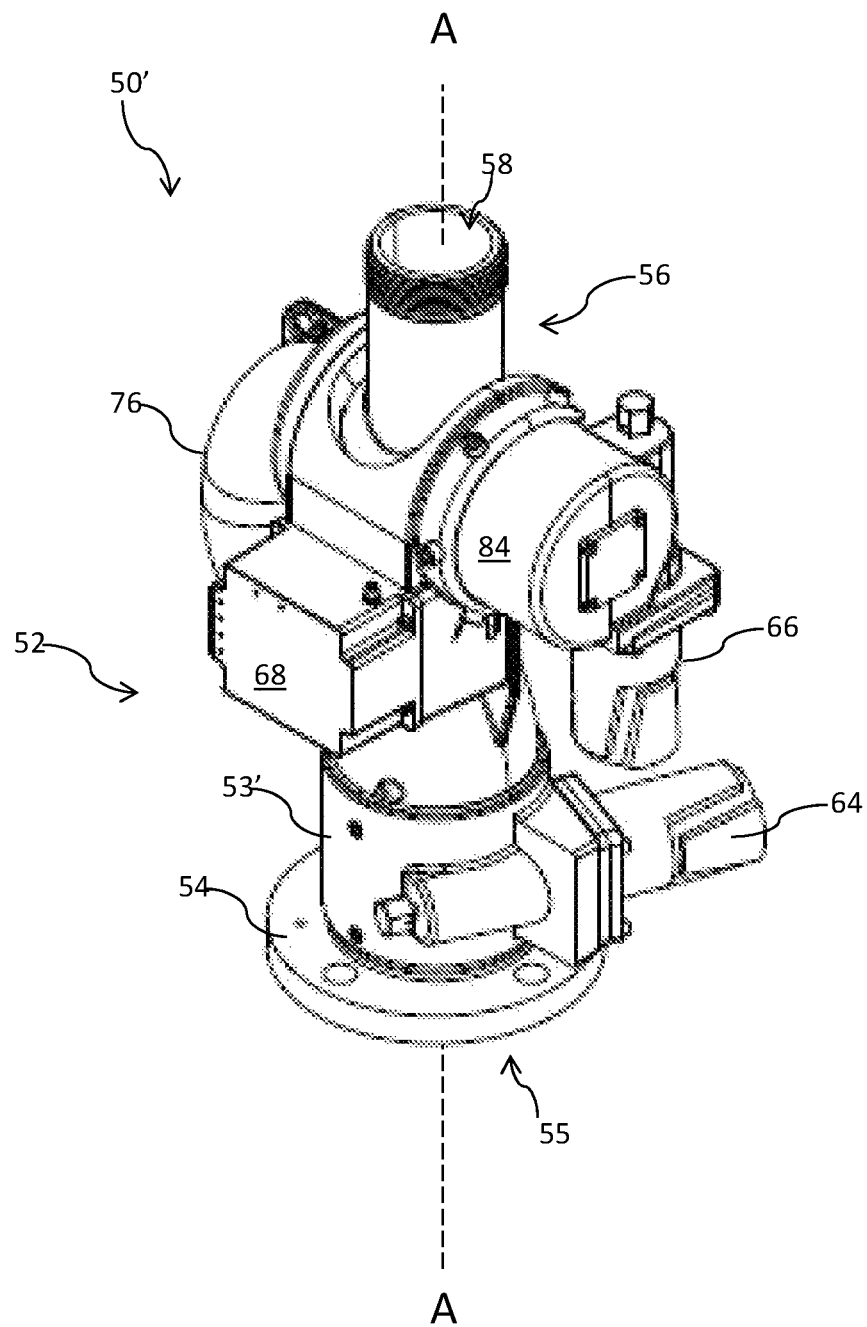
FIG. 10 is a front perspective view of another exemplary fluid delivery device.
Figure 11:
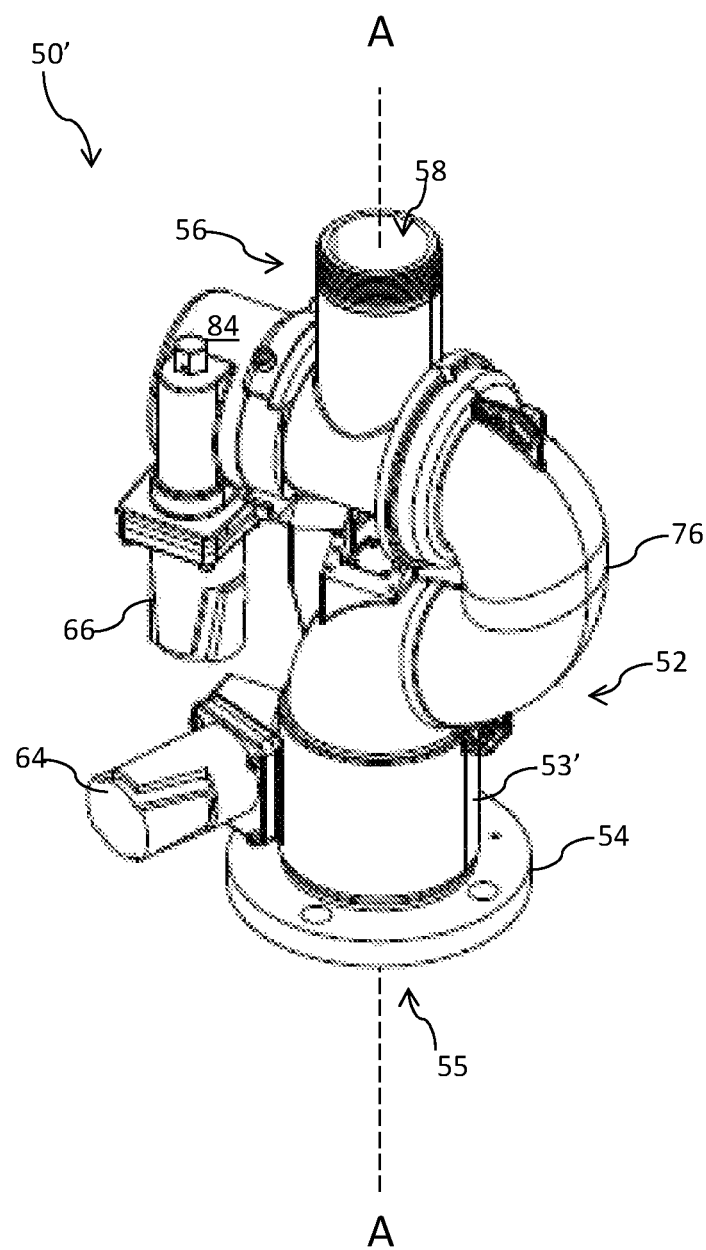
FIG. 11 is a rear elevation perspective view of the fluid delivery device of FIG. 10.

Referring next to FIGS. 7 and 8, views of the fluid delivery device 50 exploded along generally horizontal axis B-B are illustrated. First actuator 64 rotates intermediate section 52 about base section 54 as described above. In the illustrated embodiment, outlet section 56 includes a generally "L" shaped fluid channel that fluidly connects intermediate section 52 to discharge port 58. Outlet section 56 includes upper portion 57 and lower portion 59. As lower portion 59 is rotated about axis B-B, attached upper portion 57 is configured to rotate within groove 67 of cradle portion 60. Intermediate section 52 includes groove 67, defining an area of intermediate section 52 through which upper portion 57 can be positioned as lower portion 59 is rotated about axis B-B. Cradle portion 60 rigidly connects cap 84 to intermediate section 52 using a plurality of fasteners 96 (see also FIG. 4). Outlet section 56 is rotatably attached to intermediate section 52 and cap 84, allowing outlet section 56 to rotate about axis B-B. Second actuator 66 controls the rotational movement of the outlet section 56 about the intermediate section 52 by engaging an inner sleeve 110 of outlet section 56 in cap 84 as described in more detail below.

Referring next to FIGS. 9A-9D, several views of the intermediate section 52 of fluid delivery device 50 are illustrated. In the illustrated embodiment, intermediate section 52 includes lower portion 53. Lower portion 53 of intermediate section 52 is configured to be inserted into base section 54 as shown in FIG. 6. Intermediate section 52 further includes U-shaped elbow 76 and cradle portion 60. Cradle portion 60 includes groove 67 into which outlet section 56 is positioned and rotated about axis B-B.

As shown in FIG. 6, fluid delivery device 50 illustratively includes a first thrust rod 70 at least partially disposed within the fluid passageway 62 between first actuator 64 and second actuator 66. Fluid delivery device 50 further includes second thrust rod 72 at least partially disposed within cap 84. In one embodiment, thrust rods 70 is a cylindrical rod having a diameter of about 1.3 cm (½ inch), and thrust rod 72 is a cylindrical rod having a diameter of about 1.6 cm (⅝ inch). When fluid is flowing through fluid delivery device 50, first thrust rod 70 is in tension and second thrust rod 72 is in compression. First thrust rod 70 illustratively provides position information for intermediate section 52 relative to base section 54 to control system 68. Second thrust rod 72 illustratively provides position information for outlet section 56 relative to intermediate section 52 to control system 68.

In one embodiment, first thrust rod 70 illustratively receives stress from fluid flowing through a lower portion of fluid passageway 62. In this embodiment, as fluid, such as water, flows through the lower portion of fluid passageway 62, intermediate section 52 is forced in a direction away from base section 54. This upward force places stress on bearings 74C and 74D. If the upward force is too great, the rotation of intermediate section 52 about base section 54 is restricted as the bearings may be held too tightly between the rotating parts. In the illustrated embodiment, first thrust rod 70 limits the vertical movement of intermediate section 52 relative to base section 54, resulting in reduced stress on the bearings 74C and 74D.

In one embodiment, second thrust rod 72 illustratively receives stress from fluid, such as water, flowing through an upper portion of fluid passageway 62. In this embodiment, as water flow through the upper portion of fluid passageway 62, outlet section 56 is forced in a direction away from intermediate section 52. This sideways or lateral force places stress on bearings 74A and 74B. If the sideways or lateral force is too great, the rotation of outlet section 56 about intermediate section 52 is restricted as the bearings 74A and 74B may be held too tightly between the rotating parts. In the illustrated embodiment, second thrust rod 72 limits the movement of outlet section 56 relative to intermediate section 52, resulting in reduced stress on the bearings 74A and 74B. As illustrated in FIG. 6, second thrust rod 72 is not positioned in fluid passageway 62, which allows for reduced friction losses of pressurized fluid passing through fluid delivery device 50 from inlet 55 to discharge 58.

In the illustrated embodiment, first bearing 74A and U-shaped elbow 76 are positioned on the opposite side of axis A-A from second actuator 66 and second bearing 74B as viewed in FIG. 6. In one embodiment, the actuator 66 and U-shaped elbow 76 are on opposite sides of a plane including the generally vertical axis A-A. In the illustrated embodiment, positioning actuator 66 and U-shaped elbow 76 on opposite sides of a plane including the generally vertical axis A-A provides better balance for the fluid delivery device 50 about base section 54. In one embodiment in which the monitor is mounted in a non-vertical arrangement (not shown in FIGS. 4-9), the better balance about base section 54 provides increased functionality.

Referring next to FIGS. 10-17, another exemplary fluid delivery device 50' is illustrated. Illustrated fluid delivery device 50' is a monitor, but fluid delivery device 50' may comprise other suitable fluid delivery devices rotating about an axis. Other exemplary fluid delivery devices include other fire fighting fluid delivery devices, de-icing devices, and agricultural fluid delivery devices. Fluid delivery device 50' is similar to fluid delivery device 50 illustrated in FIGS. 4-9 and may include any or all of the features of fluid delivery device 50. The same numerals used to refer to components of fluid delivery device 50 are used to refer to similar components of fluid delivery device 50'. Similar to fluid delivery device 50, fluid delivery device 50' has a reduced clearance area compared to fluid delivery device 10, allowing for a more compact footprint and rotation area, as well as a larger ratio of flow rate of fluid per unit of required clearance area. As illustrated in FIGS. 10-17, fluid delivery device 50' comprises a plurality of pipe sections including base section 54, intermediate section 52, and outlet section 56. The plurality of pipe sections form a fluid passageway 62 fluidly connecting an inlet 55 configured to attach to a pressurized fluid source to an outlet or discharge port 58. In one embodiment, discharge port 58 includes a nozzle (not shown). In one embodiment, fluid delivery device 50' includes one or more vanes (not shown) helping guide the fluid through fluid passageway 62.

Figure 13:
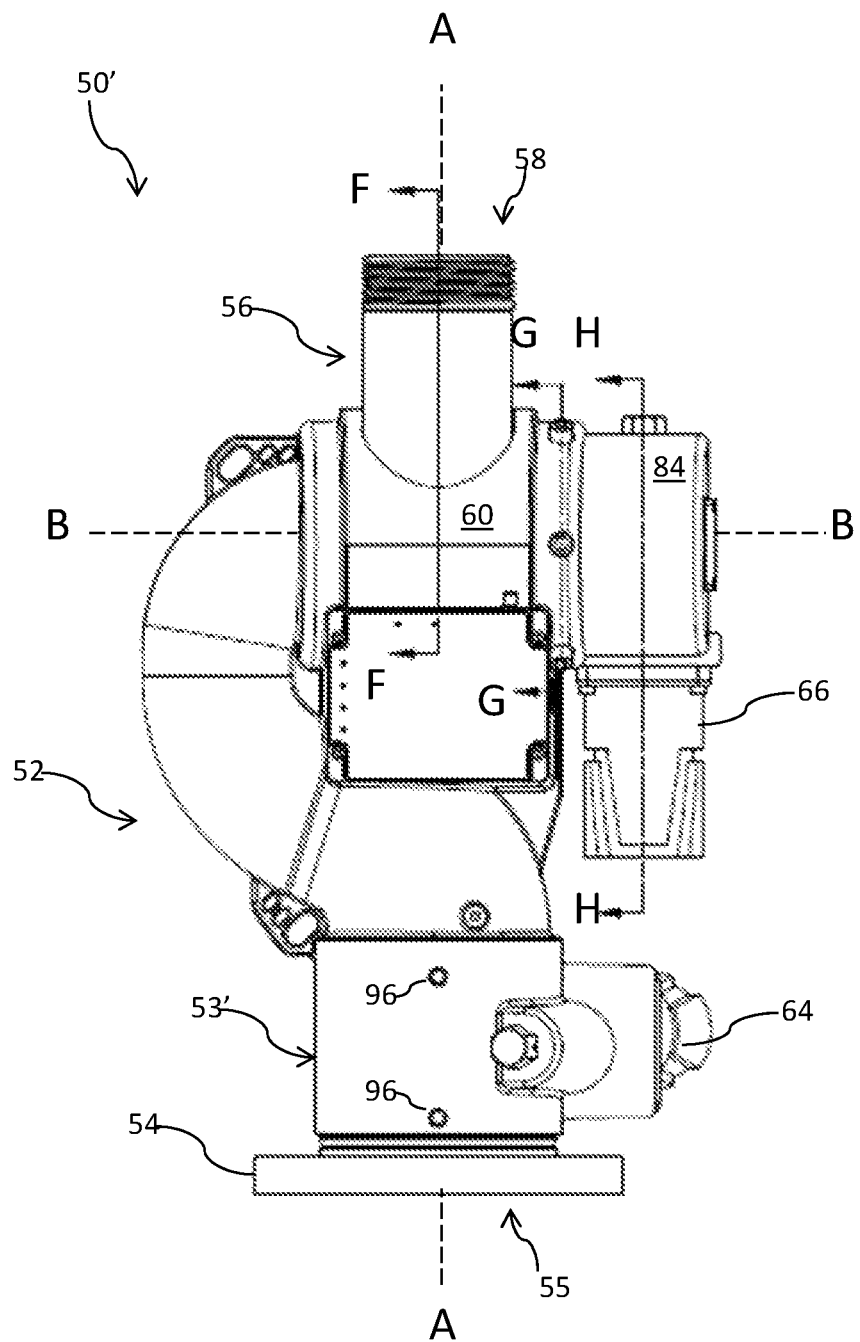
FIG. 13 is a front elevation view of the fluid delivery device of FIG. 10.

In the illustrated embodiment, intermediate section 12 is rotatably attached to base section 54 and rotates about generally vertical axis A-A, and intermediate section 52 is rotatably attached to outlet section 56 and rotates about a generally horizontal axis B-B (see FIG. 13). First actuator 64 controls the rotational movement of the intermediate section 52 about base section 54. In the embodiment illustrated in FIG. 14, the intermediate section 52 includes lower portion 53'. Lower portion 53' of intermediate section 52 is configured to fit over the exterior of base section 54. In the illustrated embodiment, first actuator 64 rotates with intermediate section 52. In other embodiments, fluid delivery device 50' includes lower portion 53 configured to be inserted into base section 54 as described above. Second actuator 66 controls the rotational movement of the outlet section 56 about the intermediate section 52 by engaging an inner sleeve 110 of outlet section 56 in cap 84. First actuator 64 and second actuator 66 may be controlled by control system 68. An exemplary control system is disclosed in U.S. Pat. No. 8,245,790, issued Aug. 21, 2012, the disclosure of which is hereby expressly incorporated by reference in its entirety. Other suitable control systems, including remote control systems having position sensors and feedback loops, and manual control, such as disclosed in U.S. Provisional Patent Application Ser. No. 61/759,226, filed Jan. 31, 2013, the disclosure of which is hereby expressly incorporated by reference in its entirety, may also be used.

Figure 12:
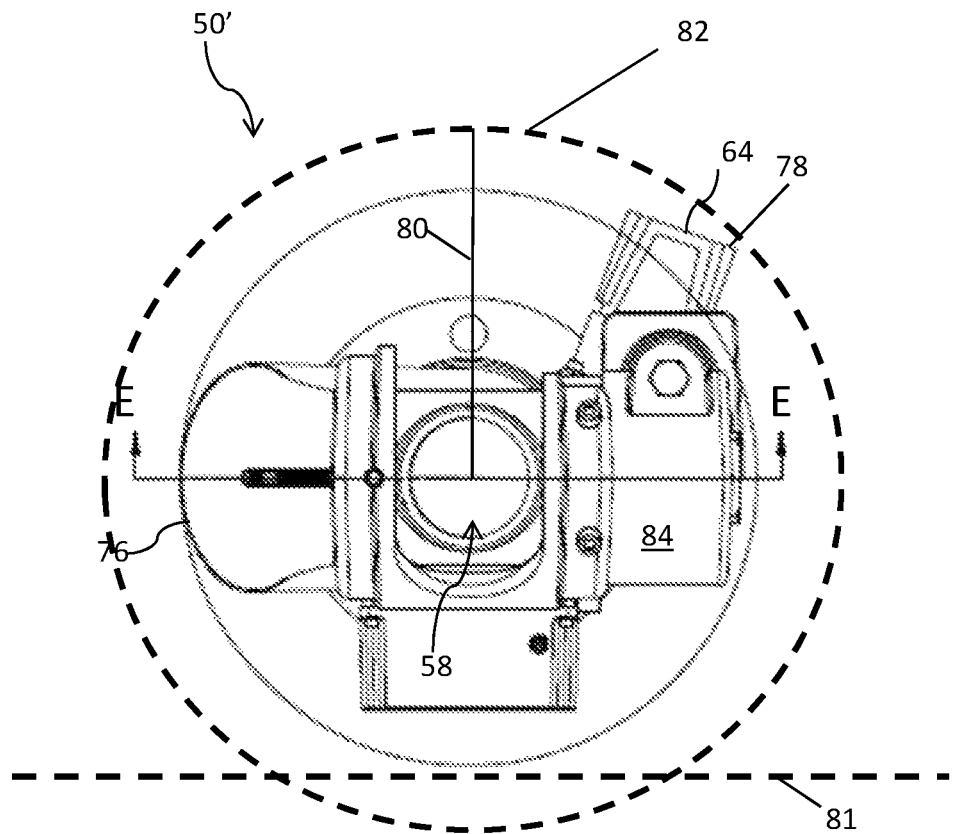
FIG. 12 is a top plan view of the fluid delivery device of FIG. 10.

As illustrated in FIG. 12, fluid delivery device 50' includes clearance defining point 78. Clearance defining point 78 is the surface of fluid delivery device 50 rotating about axis A-A that is furthest away from axis A-A. In the illustrated embodiment, clearance defining point 78 is a portion of first actuator 64. In another embodiment, the clearance defining point 78 is a portion of intermediate section 52 or second actuator 66. In still another embodiment, the clearance defining point 78 is a portion of cap 84. In one embodiment, the clearance defining point 78 is a portion of control system 68. In another embodiment, the clearance defining point 78 is a portion of U-shaped elbow 76. The distance between clearance defining point 78 and axis A-A around which fluid delivery device 50 rotates defines swing radius 80. In the illustrated embodiment, the clearance defining point 78, a portion of first actuator 64, does not cross a line 81 a fixed distance behind axis A-A during rotation about axis A-A 90 degrees clockwise or 90 degrees counterclockwise from the illustrated position. In an exemplary embodiment, the line 81 is about 15 cm (six inches) from axis A-A. Rotating fluid delivery device 50 about axis A-A defines the required clearance area 82. The required clearance area 82 is the space needed around fluid delivery device 50' to fully rotate about axis A-A.

The illustrated embodiments of fluid delivery devices may further include one or more thrust rods 70, 72. Illustratively, referring next to FIG. 14, a sectional view of fluid delivery device 50' along the line E-E in FIG. 12 is illustrated. In one embodiment, the thrust rods 70, 72 are cylindrical rods. Fluid delivery device 50' includes first thrust rod 70 connecting base section 54 to intermediate section 52. First thrust rod 70 is positioned at least partially in fluid passageway 62. In the illustrated embodiment, first thrust rod 70 is fixed to base section 54 and is attached to intermediate section 52 through thrust washers 86 on either side of a thrust bearing 88 and a thrust nut 90. A position sensor 92 monitors the position of first thrust rod 70 using positioning magnet 94.

Second thrust rod 72 is fixed to outlet section 56 and presses against cap 84. In the illustrated embodiment, second thrust rod 72 is positioned between a wall 75 of fluid passageway 62 and a sensor 92 positioned in sensor cap 98. Second thrust rod 72 includes a positioning magnet 94 and a position sensor 92 for determining the position of thrust rod 72. Thrust washers 86 and thrust bearing 88 are positioned between second thrust rod 72 and cap 84. Sensor cap 98 covers one end of second thrust rod 72. In another embodiment (not shown) a potentiometer is used in place of positioning magnet 94.

Figure 14:
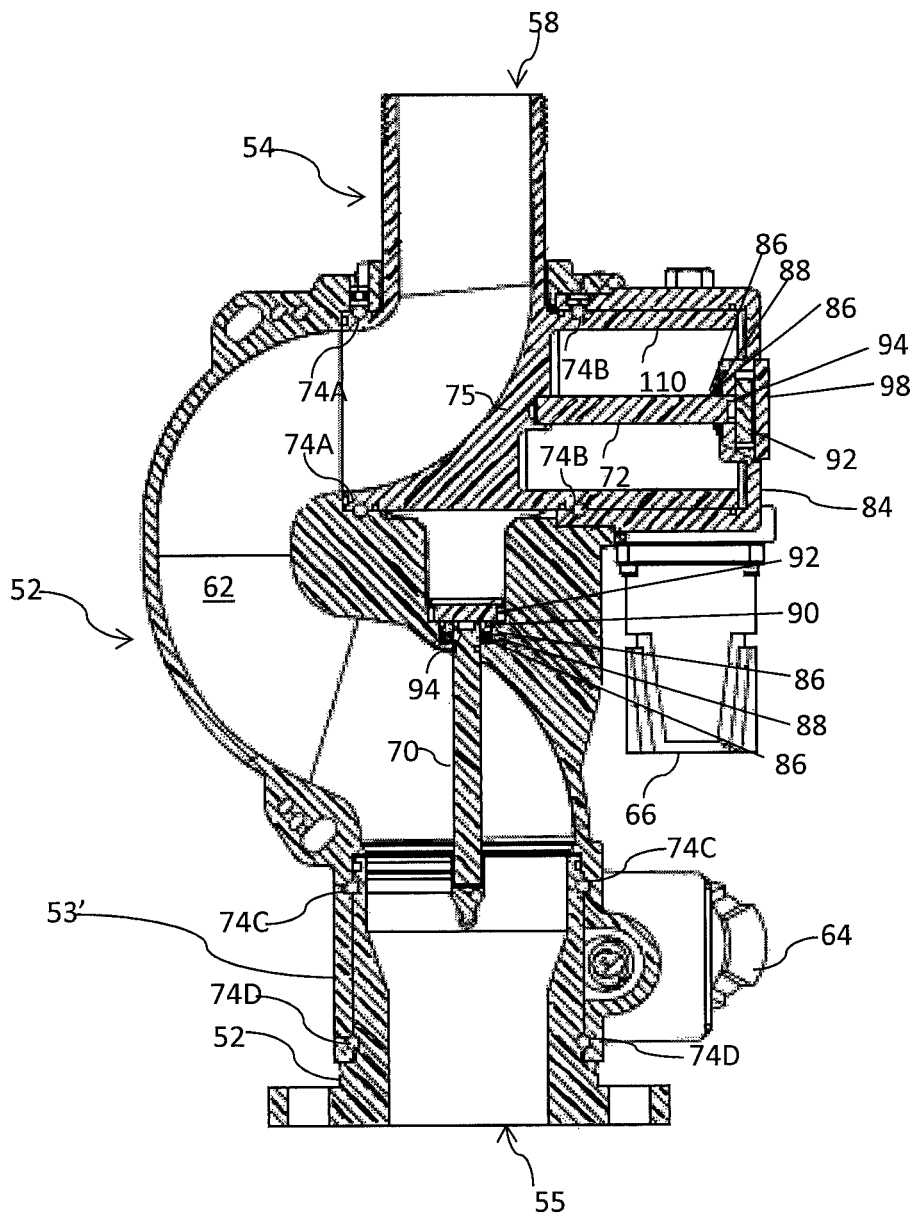
FIG. 14 is a front elevation sectional view of the fluid delivery device of FIG. 12 along the line E-E.
Figure 16:
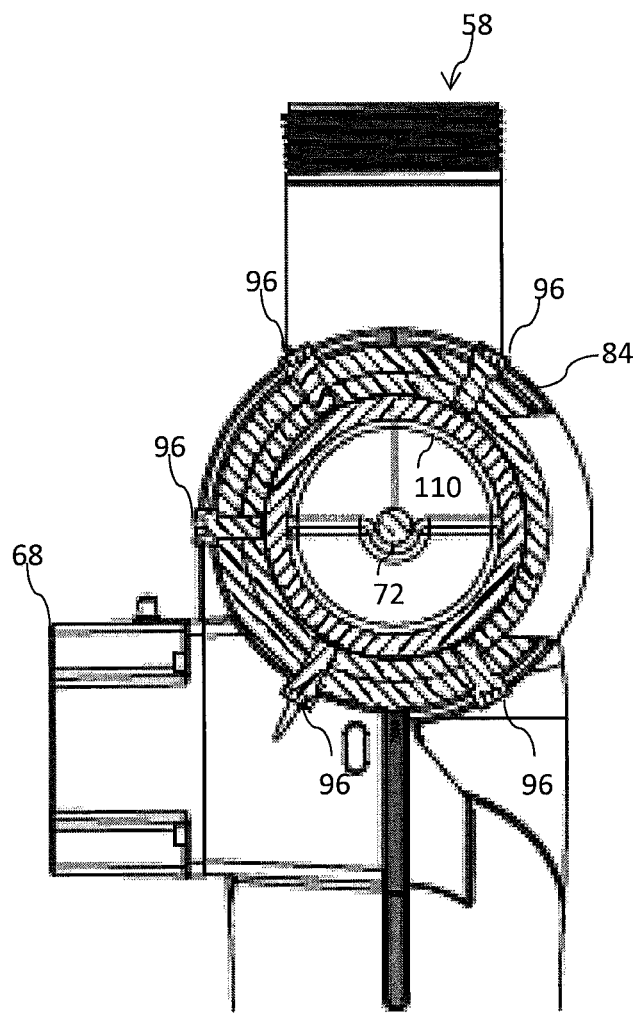
FIG. 16 is a side elevation sectional view of the fluid delivery device of FIG. 13 along the line G-G.

Cap 84 is attached to intermediate section 52 with fasteners 96 (see FIG. 16). First bearing 74A allows outlet section 56 to rotate within intermediate section 52. Second bearing 74B allows outlet section 56 to rotate within cap 84. Bearings 74C and 74D allow intermediate section 52 to rotate within base section 54. As illustrated in FIG. 14, outlet section 56 rotates about intermediate section 52 on first bearing 74A and second bearing 74B. Bearings 74 are positioned in a groove, race, or track in the pipe section for receiving the bearings. As illustrated in FIG. 14, the groove, race, or track for bearings 74A encircles fluid passageway 62, but the groove, race, or track for bearings 74B encircles inner sleeve 110 of outlet section 56, located outside of the fluid passageway 62.

Figure 15:
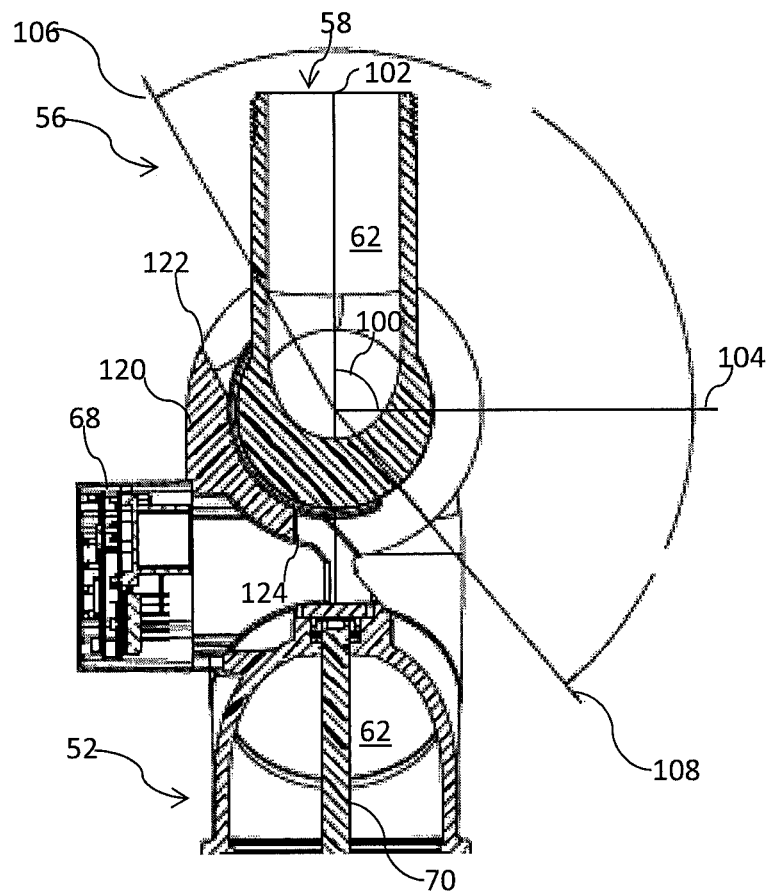
FIG. 15 is a side elevation sectional view of the fluid delivery device of FIG. 13 along the line F-F.

The illustrated embodiments of fluid delivery devices may further include a large range of motion of an outlet section relative to an intermediate section. Illustratively, referring next to FIG. 15, a sectional view of the fluid delivery device of FIG. 13 along the line F-F is illustrated. FIG. 15 illustrates a range of motion of outlet section 56 relative to intermediate section 52. Angle 100 formed between a central axis 102 of outlet section 56 and a reference plane 104 including the axis of rotation B-B. In one embodiment, reference plane 104 is substantially parallel to a bottom surface of base section 54. As illustrated in FIG. 15, outlet section 56 is positioned to form an angle 100 of about 90° between axis 102 and plane 104. Groove 67 (see FIGS. 8-9D) defines a maximum position 106 and minimum position 108 for axis 102. An exemplary maximum position 106 and an exemplary minimum position 108 for axis 102 are illustrated in FIG. 15. In one embodiment, positioning axis 102 at maximum position 106 forms an angle 100 of about 120° above plane 104. Other suitable maximum positions 106 may also be used, including positions forming angles 100 of about 180°, about 150°, and about 90°. In one embodiment, positioning axis 102 at minimum position 108 forms an angle of about 50° below plane 104. Other suitable minimum positions 108 may also be used, including positions forming angles 100 of about 30° or about 0° above reference plane 104, or about 30°, about 60°, or about 75° below reference plane 104. In the illustrated embodiment, angle 100 can vary through about 170°, from about 120° above reference plane 104 to about 50° below reference plane 104. In another embodiment, angle 100 can vary through about 165°, from about 120° above reference plane 104 to about 45° below reference plane 104. In still another embodiment, angle 100 can vary through about 135°, from about 90° above reference plane 104 to about 45° below reference plane 104. Adjusting angle 100 adjusts the position of discharge port 58, allowing fluid flowing through fluid delivery device 50' to be aimed at a fire or other desired location.

Any of the illustrated embodiments of fluid delivery devices may further include one or more thrust rods 70, 72. Illustratively, referring to the embodiment shown in FIG. 15, a connecting portion 120 between first end portion 120A and second end portion 120B (see FIG. 7) of cradle portion 60 has a non-circular cross section. As illustrated FIG. 15, the cradle portion supports outlet section 56 but does not encircle, i.e. completely surround, the fluid passageway 62. In one embodiment, the cradle portion 60 and groove 67 (see FIGS. 8-9D) allow outlet section 56 to rotate between a first position corresponding to maximum position 106 and a second position corresponding to minimum position 108. In one embodiment, connecting portion 120 is positioned between first bearing 74A and second bearing 74B. In the illustrated embodiment, when outlet section 56 is positioned at maximum upward position corresponding to a first or maximum position 106, a portion of outlet section 56 is closely positioned to or abuts a top edge 122 of connecting portion 120. In this embodiment, when outlet section 56 is positioned at a maximum downward position corresponding to second or minimum position 108, a portion of outlet section 56 is closely positioned to or abuts a lower edge 124 of connecting portion 120.

Referring next to FIG. 16, a sectional view of the fluid delivery device of FIG. 13 along the line G-G is illustrated. Fasteners 96 attach cap 84 to cradle portion 60. Inner sleeve 110 of outlet section 56 is configured to rotatably fit inside cap 84.

Figure 17:
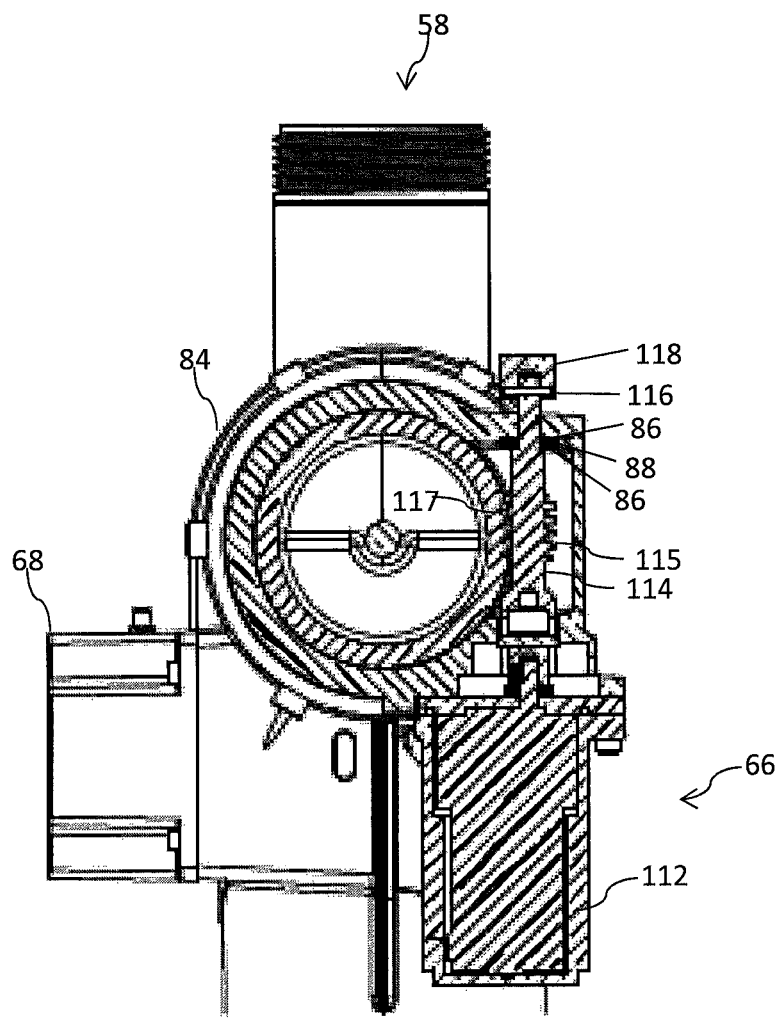
FIG. 17 is a side elevation sectional view of the fluid delivery device of FIG. 13 along the line H-H.
Figure 18:
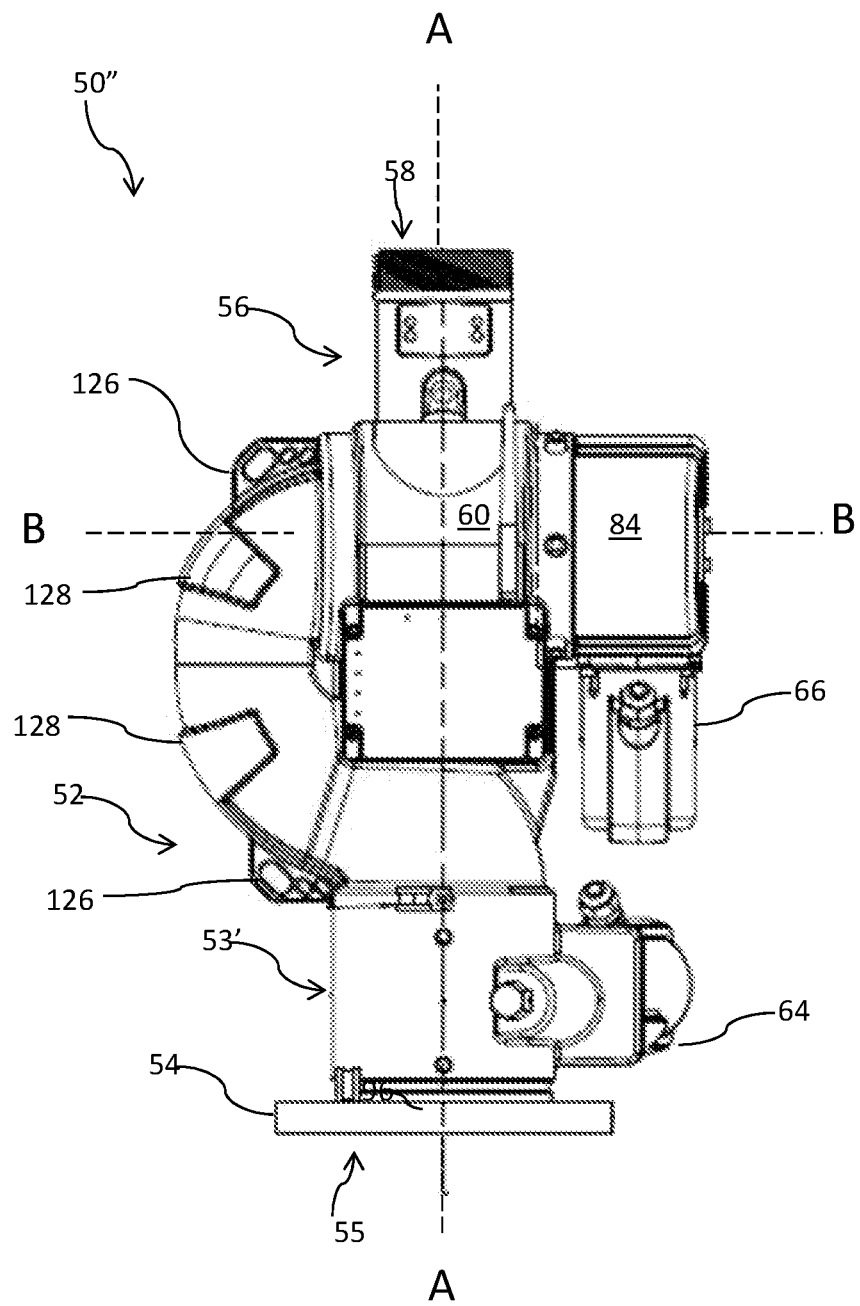
FIG. 18 is a front elevation view of still another exemplary fluid delivery device.

Referring next to FIG. 17, a sectional view of the fluid delivery device of FIG. 13 along the line H-H is illustrated. Second actuator 66 includes a motor assembly 112 driving a worm gear 114. Worm gear 114 includes a plurality of gear teeth 115 engaging with gear teeth 117 located on an exterior surface of inner sleeve 110 of outlet section 56. As motor assembly 112 drives worm gear 114, worm gear 114 engages inner sleeve 110 and rotates outlet section 56 about axis B-B relative to the cap 84 and intermediate section 52. One end of worm gear passes through cap 84 with a pair of thrust washers 86 around a thrust bearing 88. The worm gear terminates in a drive pin 116 and override nut 118 that can be used to manually turn worm gear and rotate outlet section 56.

Referring next to FIGS. 18-21, still another exemplary fluid delivery device 50" is illustrated. Illustrated fluid delivery device 50" is a monitor, but fluid delivery device 50" may comprise other suitable fluid delivery devices rotating about an axis. Other exemplary fluid delivery devices include other fire fighting fluid delivery devices, de-icing devices, and agricultural fluid delivery devices. Fluid delivery device 50" is similar to fluid delivery device 50' illustrated in FIGS. 10-17 and may include any or all of the features of fluid delivery device 50'. The same numerals used to refer to components of fluid delivery device 50' are used to refer to similar components of fluid delivery device 50". Similar to fluid delivery device 50', fluid delivery device 50" has a reduced clearance area compared to fluid delivery device 10, allowing for a more compact footprint and rotation area, as well as a larger ratio of flow rate of fluid per unit of required clearance area. As illustrated in FIGS. 18-21, fluid delivery device 50" comprises a plurality of pipe sections including base section 54, intermediate section 52, and outlet section 56. The plurality of pipe sections form a fluid passageway 62 fluidly connecting an inlet 55 configured to attach to a pressurized fluid source to an outlet or discharge 58. In one embodiment, discharge 58 includes a nozzle (not shown). In one embodiment, fluid delivery device 50" includes one or more vanes (not shown) helping guide the fluid through fluid passageway 62. In the embodiment illustrated in FIGS. 18-21, fluid delivery device 50" further includes one or more loops 126 and braces 128. In one embodiment, loops 126 allow fluid delivery device 50" to be more easily moved into position when installing fluid delivery device 50". In one embodiment, braces 128 increase the strength of intermediate section 52 of fluid delivery device 50".

Figure 19:
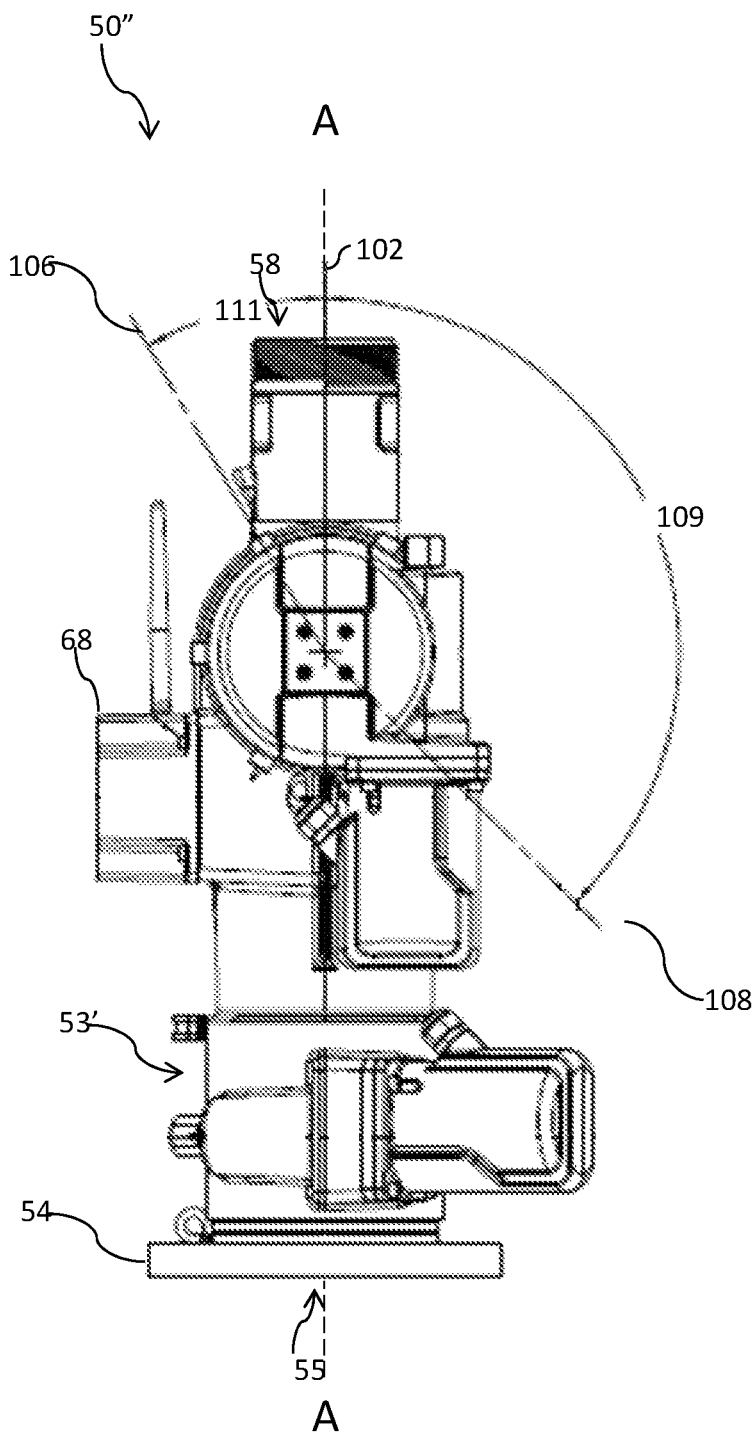
FIG. 19 is a side elevation view of the fluid delivery device of FIG. 18.
Figure 20:
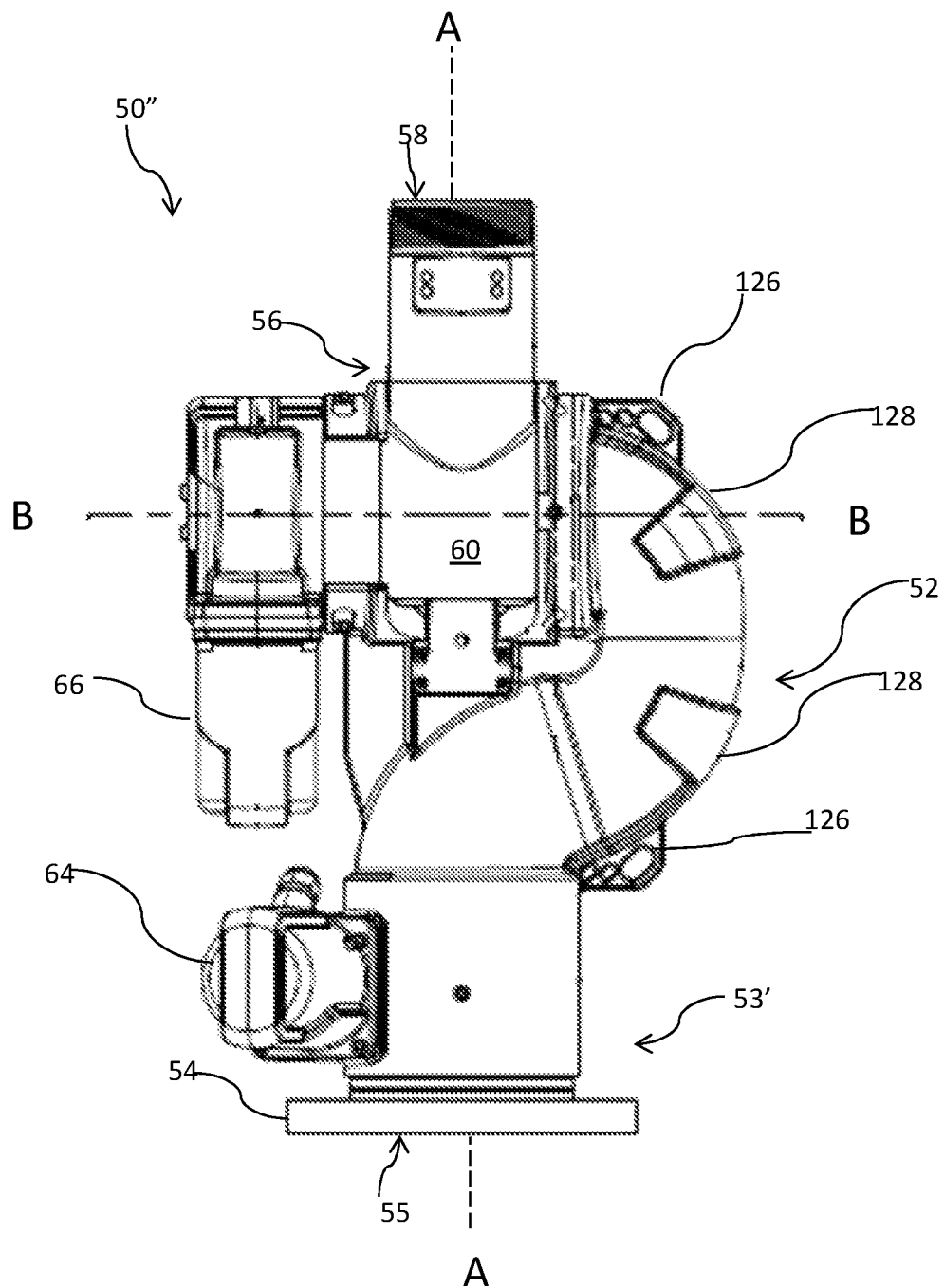
FIG. 20 is a rear elevation view of the fluid delivery device of FIG. 18.
Figure 21:
FIG. 21 is another perspective view of the fluid delivery device of FIG. 18.
Figure 22:
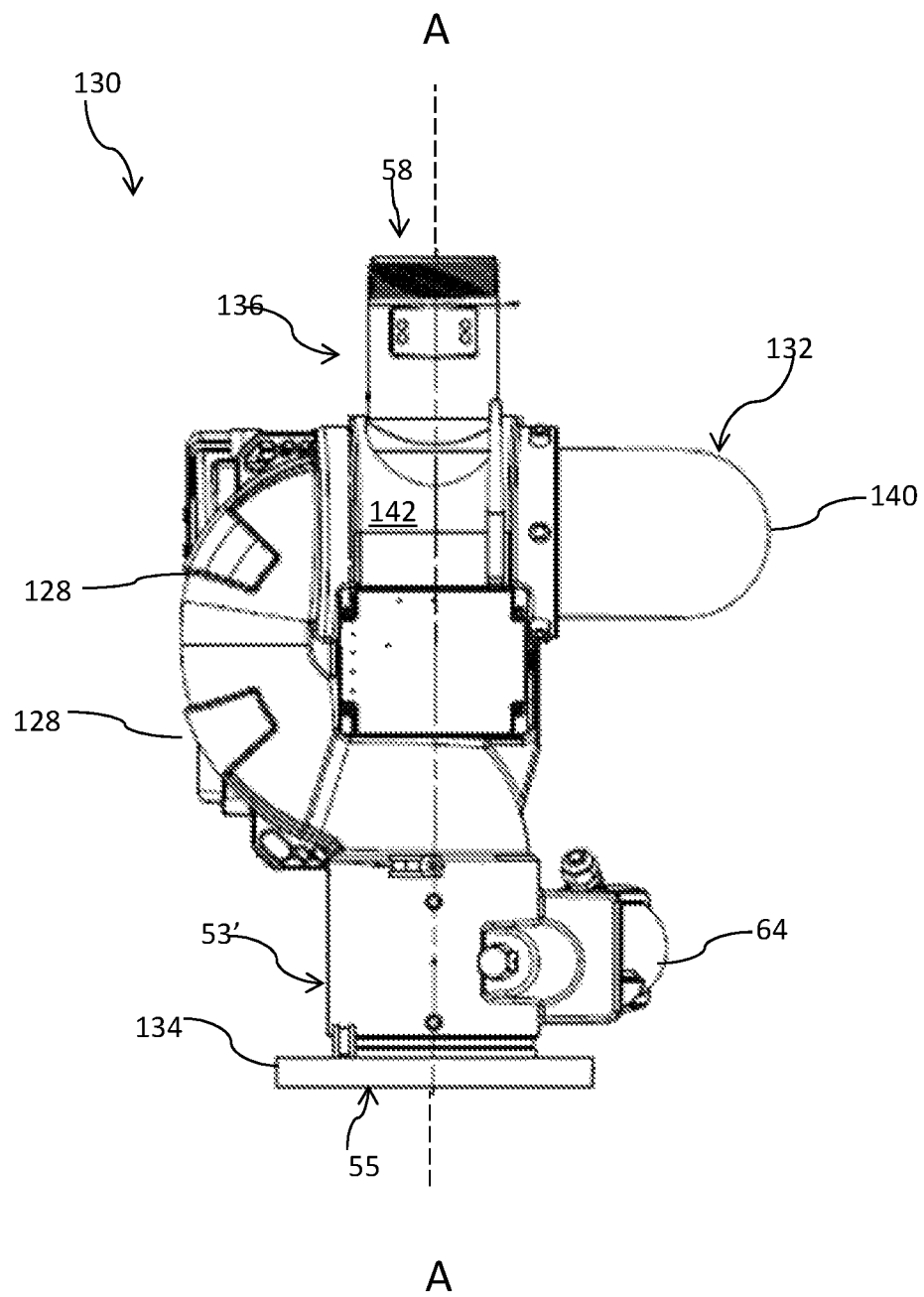
FIG. 22 is a front elevation view of yet still another exemplary fluid delivery device.

Referring next to FIG. 19, an exemplary first or maximum upward position corresponding to maximum position 106 and an exemplary second or maximum downward position corresponding to minimum position 108 for axis 102 are illustrated. In the illustrated embodiment, positioning axis 102 at maximum position 106 forms an angle 111 of about 30° from A-A and positioning axis 102 at minimum position 108 forms an angle 109 of about 135° from A-A. In other embodiments, the maximum and minimum positions form larger or smaller angles with line A-A.

Referring next to FIGS. 22-26, yet still another exemplary fluid delivery device 130 is illustrated. Illustrated fluid delivery device 130 is a monitor, but fluid delivery device 130 may comprise other suitable fluid delivery devices rotating about an axis. Other exemplary fluid delivery devices include other fire fighting fluid delivery devices, de-icing devices, and agricultural fluid delivery devices.

Fluid delivery device 130 is similar to fluid delivery device 50" illustrated in FIGS. 18-21 and may include any or all of the features of fluid delivery device 50". The same numerals used to refer to components of fluid delivery device 50" are used to refer to similar components of fluid delivery device 130. As illustrated in FIGS. 22-26, fluid delivery device 130 comprises a plurality of pipe sections including base section 134, intermediate section 132, and outlet section 136. The plurality of pipe sections form a fluid passageway fluidly connecting an inlet 55 configured to attach to a pressurized fluid source to an outlet or discharge 58. In one embodiment, discharge 58 includes a nozzle (not shown). In one embodiment, fluid delivery device 130 includes one or more vanes (not shown) that assist in guiding fluid through the fluid passageway.

Figure 23:
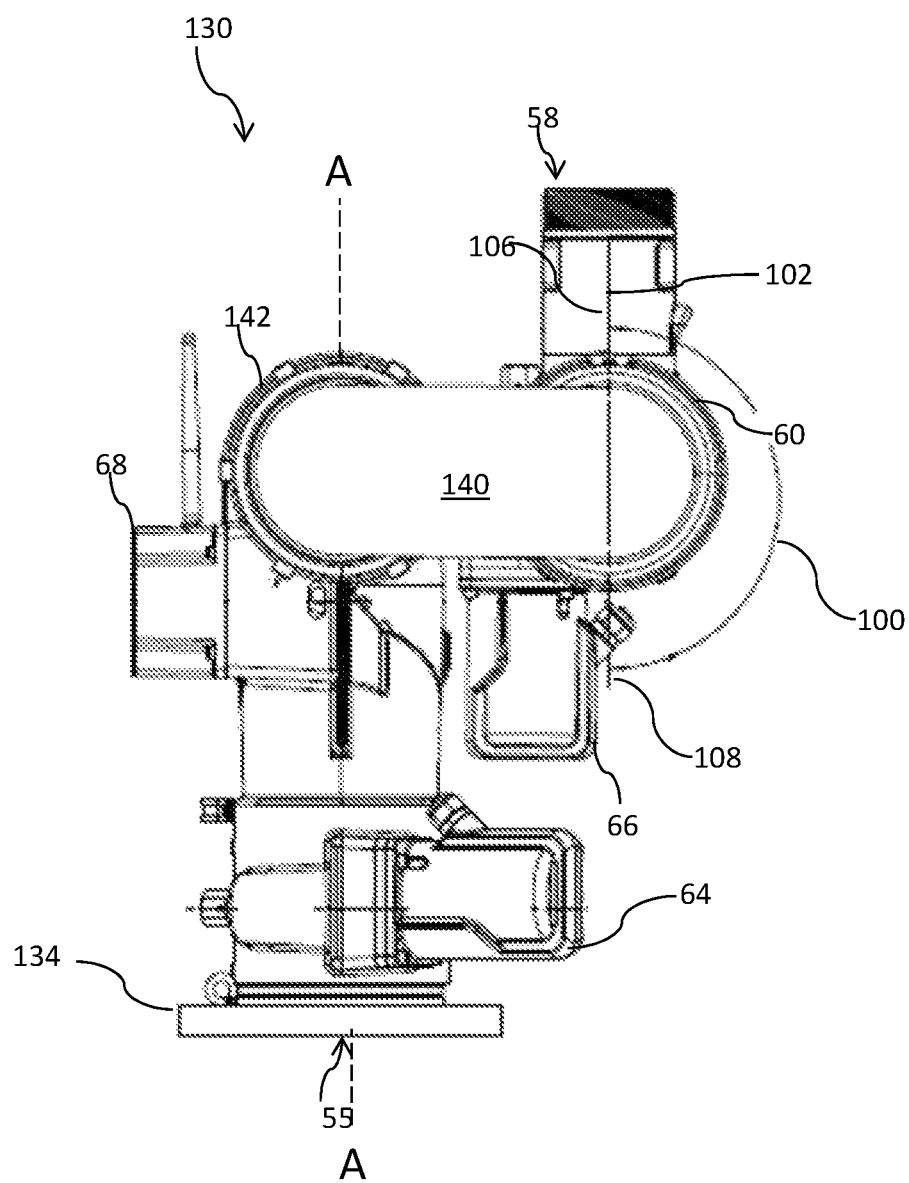
FIG. 23 is a side elevation view of the fluid delivery device of FIG. 22.
Figure 24:
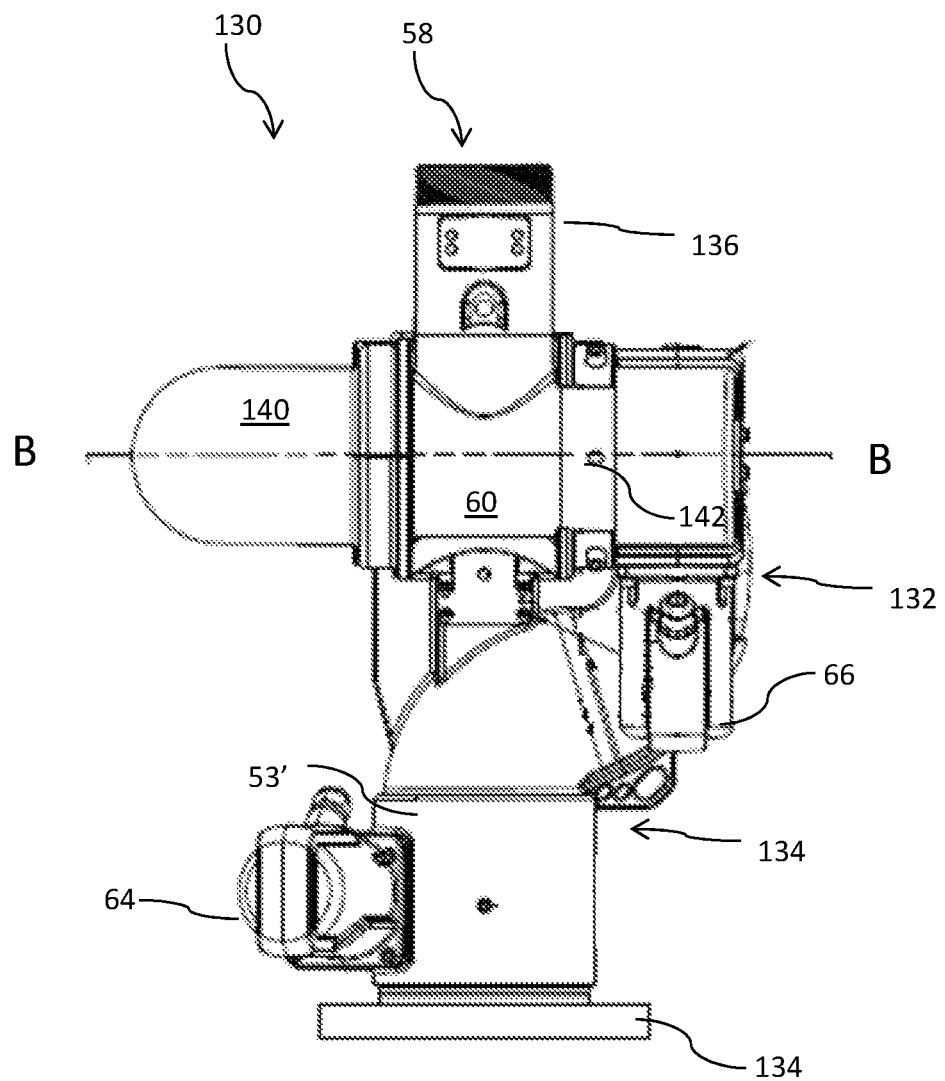
FIG. 24 is a rear elevation view of the fluid delivery device of FIG. 22.
Figure 25:
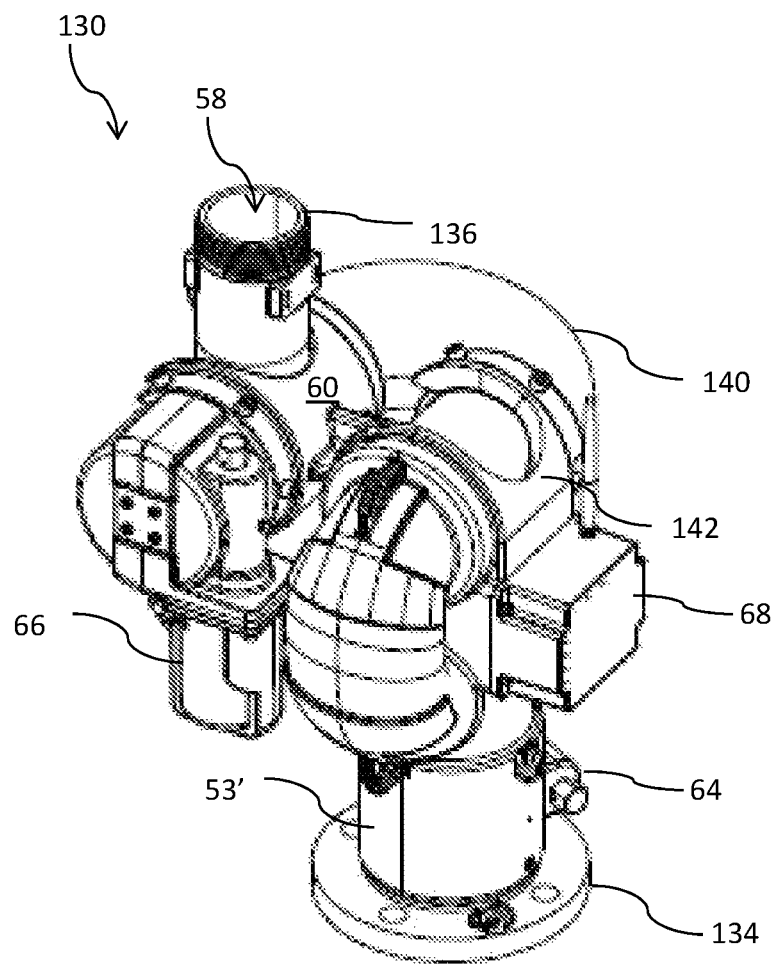
FIG. 25 is another perspective view of the fluid delivery device of FIG. 22.

In the embodiment illustrated in FIGS. 22-26, intermediate section 132 further includes bend 140 and bracket 142. In the illustrated embodiment, bend 140 allows cradle portion 60 to be offset relative to base section 54 and the lower portion of fluid delivery device 130. As illustrated in FIG. 23, offsetting the cradle portion 60 increases the angle 100 through which outlet section 136 is able to rotate. An exemplary maximum position 106 and an exemplary minimum position 108 for axis 102 are illustrated. In the illustrated embodiment, outlet section 136 is driven by second actuator 66 through 180° of travel. In other embodiments, outlet section 136 is configured to rotate through more or less than 180° of travel.

Figure 26:
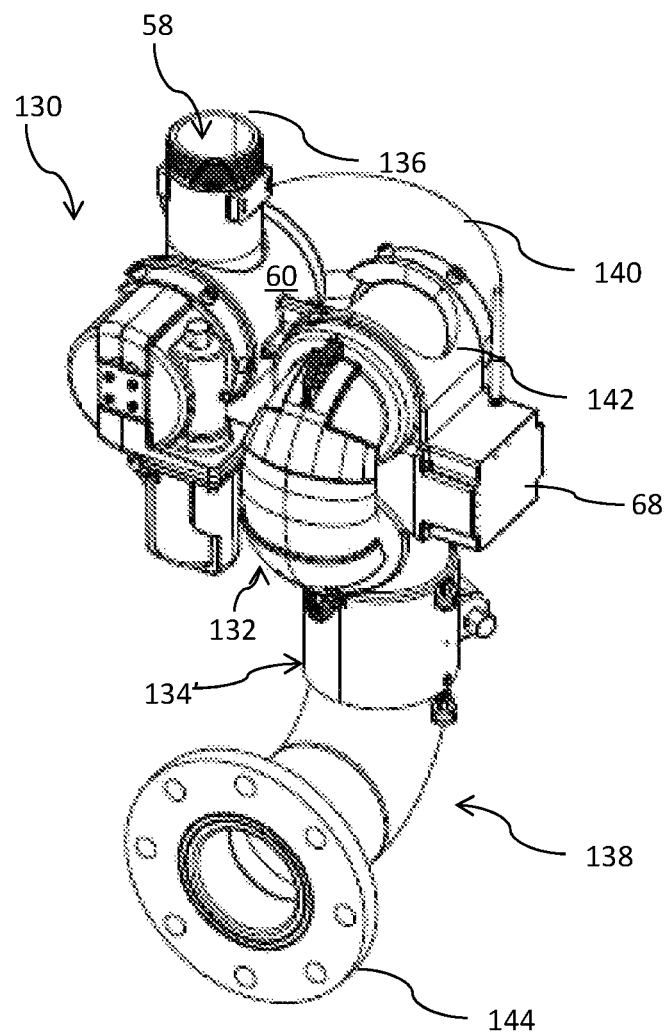
FIG. 26 is yet another perspective view of the fluid delivery device of FIG. 22 attached to a 90° bent flange base.

Referring next to FIG. 26, fluid delivery device 130 is illustrated attached to a 90° bent flange base 138. Bent flange base 138 attaches to base portion 134'. Bent flange base 138 includes a mounting plate 144. When mounting plate 144 is attached to a surface, such as to a firefighting or de-icing vehicle (not shown), bent flange base 138 orients fluid delivery device 130 to allow discharge port 58 to rotate in a generally horizontal plane and intermediate section 132 to rotate in a generally vertical plane.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. A fluid delivery device comprising:
   a base section;
   an intermediate section rotatably connected to the base section and configured to rotate about a first axis relative to the base section, the intermediate section including an elbow portion;

an outlet section rotatably connected to the intermediate section and configured to rotate about a second axis relative to the intermediate section;
an actuator configured to rotate the outlet section relative to the intermediate section about the second axis, wherein the elbow portion of the intermediate section and the actuator are located on opposite sides of a plane including the first axis;
a discharge port configured to be positioned at least partially in the outlet section; and
a thrust rod between the intermediate section and the outlet section;
wherein, a fluid passageway passes through the base section, the intermediate section, and the outlet section providing pressurized fluid to the discharge port;
wherein, the thrust rod being positioned at least partially outside the fluid passageway and configured to be in compression when pressurized fluid is provided in the fluid passageway.

2. The fluid delivery device of claim 1, wherein the base section is configured to be coupled in fluid communication with a pressurized fluid source.

3. The fluid delivery device of claim 1, wherein the first axis is transverse to the second axis.

4. The fluid delivery device of claim 1, wherein the outlet section is rotatably connected to the intermediate section by a first rotatable bearing and a second rotatable bearing, the fluid passageway passing through the first rotatable bearing but located outside the second rotatable bearing.

5. The fluid delivery device of claim 4, wherein the intermediate section includes a cradle configured to support the outlet section and allow the outlet section to rotate between a first position and a second position, and wherein the cradle does not encircle the fluid passageway.

6. The fluid delivery device of claim 1, further comprising a second actuator configured to rotate the intermediate section relative to the base section about the first axis.

7. A fluid delivery device comprising:
a base section configured to be in fluid communication with a pressurized fluid source;
an intermediate section rotatably connected to the base section and configured to rotate about a first axis relative to the base section;
an outlet section rotatably connected to the intermediate section by a first rotatable bearing and a second rotatable bearing, the outlet section being configured to rotate about a second axis relative to the intermediate section;
a fluid passageway passing through the base section, the intermediate section, and the outlet section providing pressurized fluid to a discharge port in the outlet section, the fluid passageway passing through the first rotatable bearing but located outside the second rotatable bearing; and
a thrust rod between the base section and the intermediate section, the thrust rod being positioned at least partially in the fluid passageway and configured to be in tension when pressurized fluid is provided in the fluid passageway.

8. The fluid delivery device of claim 7, further comprising an actuator configured to rotate the outlet section relative to the intermediate section about the first axis.

9. The fluid delivery device of claim 8, wherein the first axis is a generally horizontal axis.

10. The fluid delivery device of claim 7, further comprising an actuator configured to rotate the intermediate section relative to the base section about the second axis.

11. The fluid delivery device of claim 10, wherein the second axis is a generally vertical axis.

12. The fluid delivery device of claim 7, wherein the intermediate section includes a cradle configured to support the outlet section and allow the outlet section to rotate between a first position and a second position, and wherein the cradle does not encircle the fluid passageway.

13. The fluid delivery device of claim 7, further comprising an actuator configured to rotate the outlet section relative to the intermediate section, wherein the intermediate section includes an elbow portion and the elbow portion and the actuator are located on opposite sides of a plane including the first axis.

14. A fluid delivery device comprising:
a base section configured to be in fluid communication with a pressurized fluid source;
an intermediate section rotatably connected to the base section and configured to rotate about a first axis relative to the base section, the intermediate section including a cradle; and
an outlet section rotatably connected to the cradle and configured to rotate about a second axis relative to the intermediate section;
a fluid passageway passing through the base section, intermediate section, and outlet section configured to provide pressurized fluid to a discharge port in the outlet section;
wherein the cradle does not encircle the fluid passageway, the cradle being configured to support the outlet section and allow the outlet section to rotate between a first position and a second position.

15. The fluid delivery device of claim 14, wherein the first axis is generally orthogonal to the second axis.

16. The fluid delivery device of claim 14, wherein the outlet section forms an angle of about 120° above a horizontal plane passing through the second axis when the outlet section is in the first position.

17. The fluid delivery device of claim 16, wherein the outlet section forms an angle of about 45° below the horizontal plane passing through the second axis when the outlet section is in the second position.

18. The fluid delivery device of claim 14, wherein the first position and the second position are separated by an angle of about 165°.

19. The fluid delivery device of claim 14, wherein the first position and the second position are separated by an angle of about 135°.

20. The fluid delivery device of claim 14, wherein the cradle portion is offset relative to the base section.

21. A fluid delivery device comprising:
a base section configured to be in fluid communication with a pressurized fluid source;
an intermediate section rotatably connected to the base section and configured to rotate about a first axis relative to the base section;
an outlet section rotatably connected to the intermediate section and configured to rotate about a second axis relative to the intermediate section;
a fluid passageway passing through the base section, the intermediate section, and the outlet section providing pressurized fluid to a discharge port in the outlet section; and
a thrust rod between the intermediate section and the outlet section, the thrust rod being positioned at least partially outside the fluid passageway and configured to be in compression when pressurized fluid is provided in the fluid passageway.

22. The fluid delivery device of claim 21, wherein the first axis is transverse to the second axis.

23. The fluid delivery device of claim 21, further comprising a second thrust rod between the base section and the intermediate section, the thrust rod being positioned at least partially in the fluid passageway and configured to be in tension when pressurized fluid is provided in the fluid passageway.

24. The fluid delivery device of claim 21, wherein the fluid passageway includes a generally "L" shaped fluid channel fluidly connecting the intermediate section to the outlet section.

25. The fluid delivery device of claim 21, wherein the thrust rod is positioned completely outside the fluid passageway.

\* \* \* \* \*